United States Patent
O'Leary et al.

(10) Patent No.: US 7,171,630 B2
(45) Date of Patent: Jan. 30, 2007

(54) ELECTRONIC SIMULATION OF INTERACTION WITH PRINTED MATTER

(75) Inventors: Peter O'Leary, San Francisco, CA (US); Gerald R. Hogsett, II, Redwood City, CA (US)

(73) Assignee: Zinio Systems, Inc., San Francisco, CA (US)

( * ) Notice: Subject to any disclaimer, the term of this patent is extended or adjusted under 35 U.S.C. 154(b) by 793 days.

(21) Appl. No.: 10/289,619

(22) Filed: Nov. 6, 2002

(65) Prior Publication Data

US 2003/0117425 A1 Jun. 26, 2003

Related U.S. Application Data

(60) Provisional application No. 60/345,157, filed on Nov. 6, 2001.

(51) Int. Cl.
G06F 3/00 (2006.01)
(52) U.S. Cl. .................. 715/856; 715/776; 715/901
(58) Field of Classification Search ............ 345/901, 345/619, 428; 715/771, 776, 856, 901
See application file for complete search history.

(56) References Cited

U.S. PATENT DOCUMENTS

| | | | | |
|---|---|---|---|---|
| 5,237,651 A | * | 8/1993 | Randall .................. 715/776 |
| 5,463,725 A | * | 10/1995 | Henckel et al. ............ 715/776 |
| 5,663,748 A | * | 9/1997 | Huffman et al. ............ 345/173 |
| 5,696,982 A | * | 12/1997 | Tanigawa et al. .......... 715/528 |
| 5,796,401 A | * | 8/1998 | Winer ................... 345/619 |
| 5,900,876 A | * | 5/1999 | Yagita et al. .............. 715/776 |
| 5,909,207 A | * | 6/1999 | Ho ...................... 345/156 |
| D422,991 S | | 4/2000 | Regan, Jr. et al. |
| D436,580 S | | 1/2001 | Navano et al. |
| 6,229,502 B1 | * | 5/2001 | Schwab ................ 345/1.1 |
| 2003/0004825 A1 | * | 1/2003 | Olson et al. .............. 705/26 |

* cited by examiner

Primary Examiner—Kieu D. Vu
Assistant Examiner—Ting Zhou
(74) Attorney, Agent, or Firm—Van Pelt, Yi & James LLP

(57) ABSTRACT

A system, method, and computer readable medium having computer instructions provided thereon for enabling a computer to perform a method of simulating the effect of page turning including displaying a first image corresponding to a first side of a printed page on a display, where an aspect ratio of the display is automatically adjusted to an aspect ratio of the printed document, responding to user input to simulate turning the printed page to display a second image corresponding to a second side of the printed page and consecutively rendering individual representations of images of the page from a set of discrete representations one at a time to simulate the page being turned.

32 Claims, 29 Drawing Sheets

LEFT GATEFOLD UNFOLDED (DOUBLE PAGE DISPLAY MODE):

BASIC SINGLE PAGE DISPLAY

BASIC 2 PAGE DISPLAY

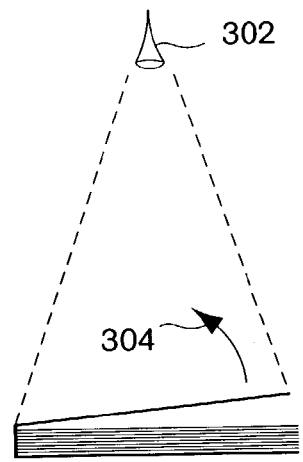
Fig. 3A1
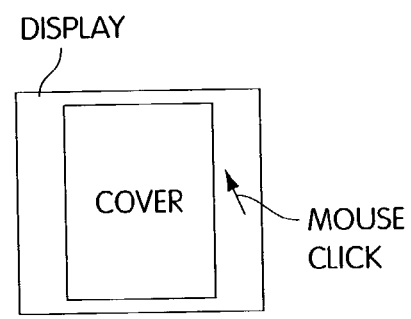
Fig. 3A2
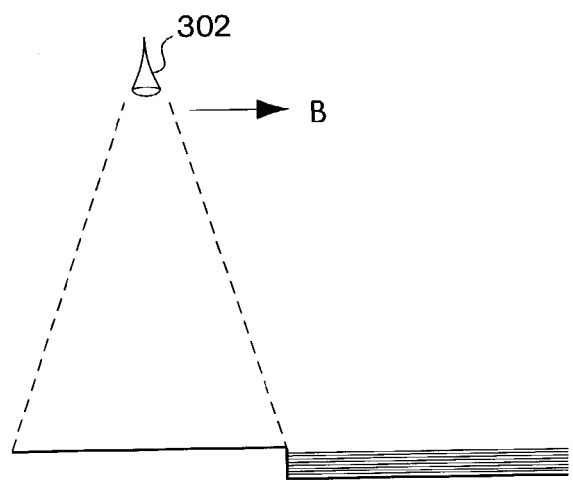
Fig. 3B1
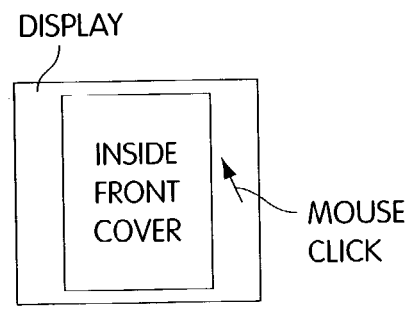
Fig. 3B2

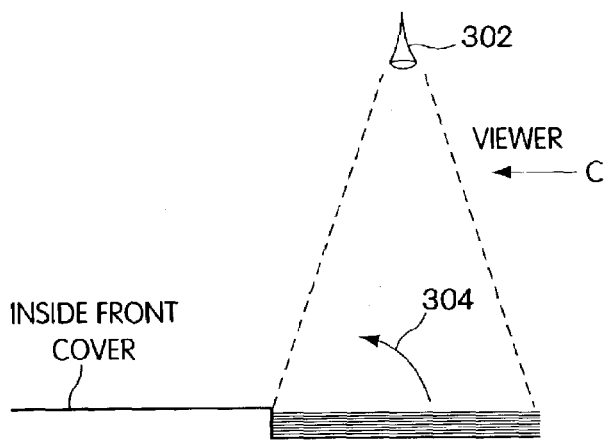
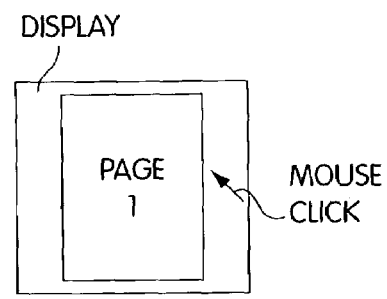
Fig. 3C1  Fig. 3C2
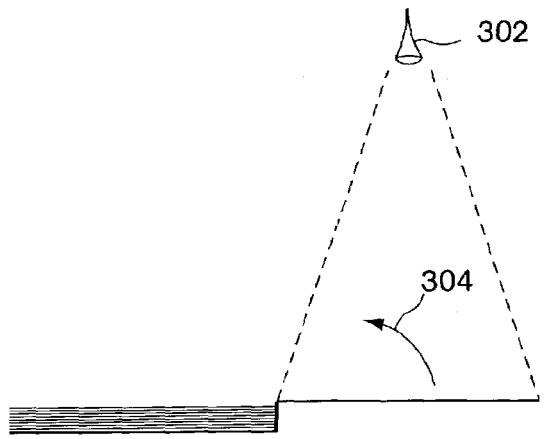
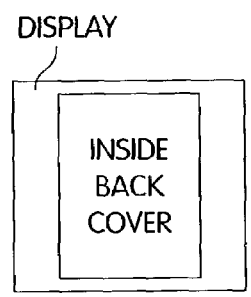
Fig. 3D1  Fig. 3D2
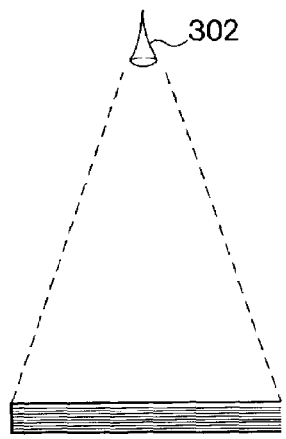
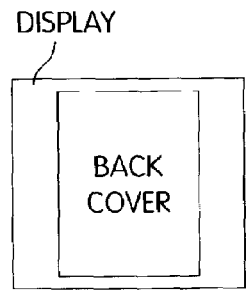
Fig. 3E1  Fig. 3E2

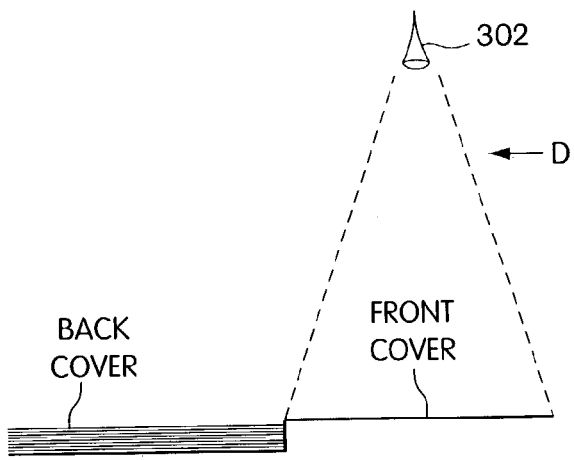
Fig. 3F1
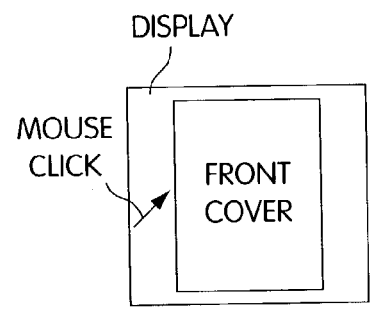
Fig. 3F2
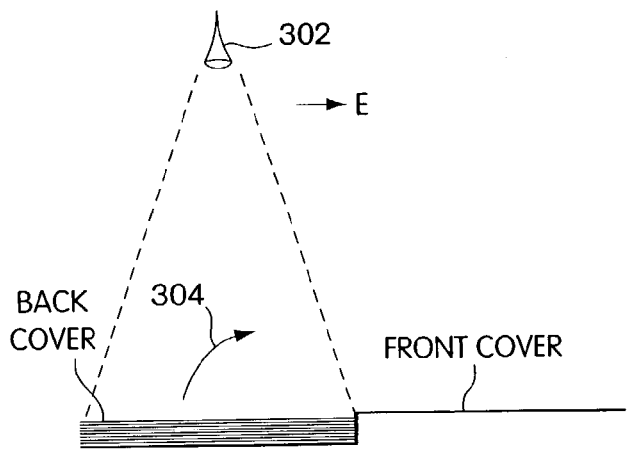
Fig. 3G1
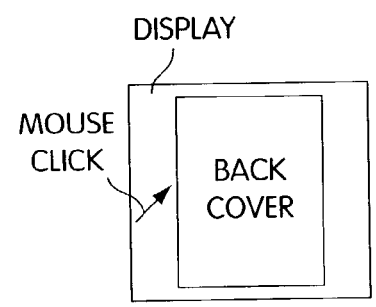
Fig. 3G2
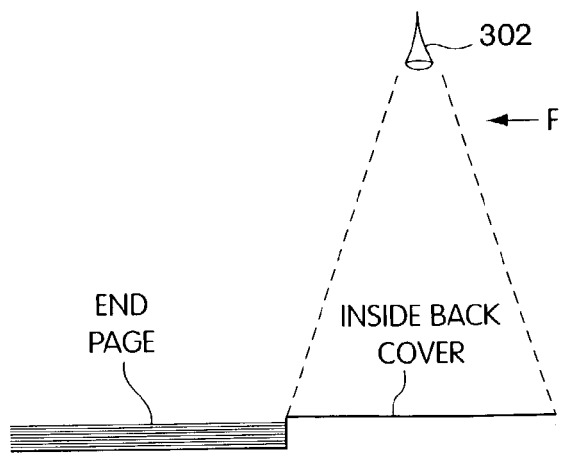
Fig. 3H1
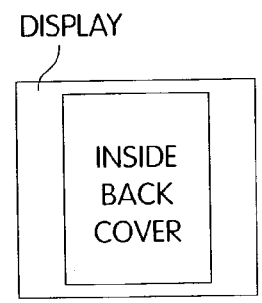
Fig. 3H2

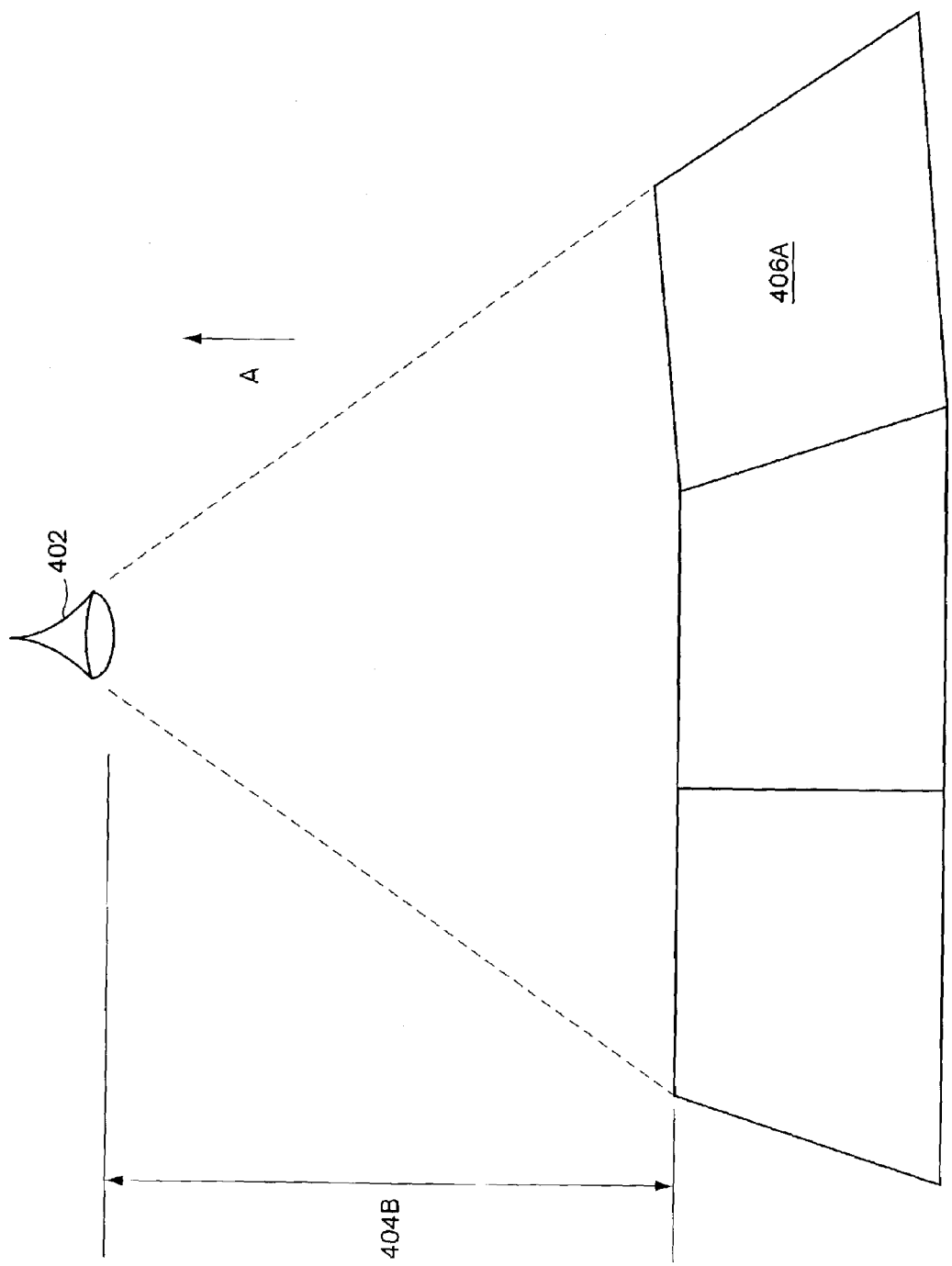

DOUBLE PAGE MODE, WITH TWO FOLDED GATEFOLD PAGES

SAME TWO GATEFOLD PAGES, NOW UNFOLDED, IN DOUBLE PAGE DISPLAY MODE

LEFT GATEFOLD UNFOLDED (DOUBLE PAGE DISPLAY MODE):

RIGHT GATEFOLD PAGE UNFOLDED (DOUBLE PAGE DISPLAY MODE):

RIGHT GATEFOLD PAGE UNFOLDED (DOUBLE PAGE DISPLAY MODE):

DOUBLE PAGE MODE DISPLAY WITH AN INSERT ON THE RIGHT SIDE double page mode display with an insert on the left side

SINGLE PAGE DISPLAY MODE WITH AN INSERT (LEFT MOST PAGE)

ELECTRONIC SIMULATION OF INTERACTION WITH PRINTED MATTER

RELATED APPLICATIONS

This application claims benefit under 35 U.S.C. § 119 of U.S. Provisional Patent Application No. 60/345,157 filed Nov. 6, 2001, the entire disclosure of which is herein incorporated by reference, and also is related to co-pending and co-owned U.S. patent application Ser. No. 09/897,192, the entire disclose of which is herein incorporated by reference.

FIELD OF THE PRESENT INVENTION

The present invention is related to the electronic viewing of documents, and more particularly, to the simulation of an interaction between a viewer and a printed publication, and even more particularly, to the simulation of page turning using animation of such images to simulate an virtual turning of a printed page of a publication (preferably a bound printed publication).

BACKGROUND OF THE PRESENT INVENTION

In the prior art, various methods have been developed for displaying documents including ordinary word processors to display text documents, image viewers, web browsers, and other specialty viewers including Adobe Acrobat (and the like). Other prior art discloses methods and systems which allegedly disclose page turning simulations that attempt to simulate the turning of pages of an electronic document to appear as though the viewer is turning the page of an actual book. Such prior art methods include those described in U.S. Pat. Nos. 5,053,762, 5,463,725, 5,233,332, 5,519,827, 5,625,420, 5,801,713, 5,900,876, and PCT application Nos. WO 97/22104 and WO 02/21307. The methods depicted in these references purportedly simulate the effect of paper page turning by either implementing a transformation of pixel image data in two-dimensional space using pixel processing hardware, or by attempting to simulate a three-dimensional projection into the two-dimensional space of the screen using arcs that lie in the same plane as the screen and using pixel compression and smoothing techniques to yield an impression of a page being turned in three dimensional space.

However, these prior art methods are not without limitations. For example, the hardware implementations used with these methods cannot adjust to changes in content format. This limits them to a single aspect ratio of material with which they can work. To that end, the methods and systems according to the prior art will require to be redesigned to accommodate new page and screen aspect ratios and resolutions.

Another problem is that the pixel compression algorithms of the prior art methods and systems do not accommodate larger page sizes and higher resolution when processing power remains constant. Moreover, the prior art methods and systems cannot be easily adjusted to simulate different types of paper and styles of page-flip animation, and cannot simulate a page that is bent as it is turned, which is more natural for thin pages such as those found in magazines and catalogs.

SUMMARY OF THE INVENTION

Accordingly, the present invention addresses the setbacks and problems of the prior art and presents a novel method of simulating the interaction between a viewer and an electronic image of a printed publication.

Accordingly, in a first aspect of the present invention, a method for electronically simulating interaction with images of printed matter includes displaying a first image corresponding to a first printed page on a display and responding to user input to simulate turning the page to display a second image corresponding to a second printed page. With this aspect, an aspect ratio of the display may be automatically adjusted to an aspect ratio of the page. Moreover, the present aspect may include selecting a display mode of the display, which may include a single page view mode or a multiple page view mode.

In another aspect of the present invention, a method of simulating the effect of page turning includes displaying a first image corresponding to a first side of a printed page on a display, where an aspect ratio of the display is automatically adjusted to an aspect ratio of the printed document. The method also includes responding to user input to simulate turning the printed page to display a second image corresponding to a second side of the printed page and consecutively rendering individual representations of images of the page from a set of discrete representations one at a time to simulate the page being turned.

In the above aspect, the rendering may include creating an array of X, Y and Z first coordinates representing points on a grid in a three dimensional space, storing values in the array representing an image of the shape of the page at snapshots in time as the page is turned and dividing the image of the page into a rectilinear grid of second coordinates of sub-images whose aspect ratios match the aspect ratios of a set of convex four-sided polygons bounded by said X, Y and Z coordinates. Upon the grid of second coordinates includes a plurality of points A in one dimension and a plurality of second points B in another dimension, the number of rectilinear sub-images are substantially in accordance with the formula $(A-1)*(B-1)$. Rendering may also include texture-mapping said grid of sub-images onto a set of convex four-sided polygons bounded by said first coordinate points.

In another aspect of the present invention, a system for performing a method for electronically simulating interaction with images of printed matter includes displaying means for displaying a first image corresponding to a first side of a printed page on a display, where an aspect ratio of the display is automatically adjusted to an aspect ratio of the page and responding means for responding to user input to simulate turning the page to display a second image corresponding to a second side of the page.

In yet another aspect of the present invention, a system for performing a method of simulating the effect of page turning includes displaying means for displaying a first image corresponding to a first side of a printed page on a display, where an aspect ratio of the display is automatically adjusted to an aspect ratio of the printed document, responding means for responding to user input to simulate turning the printed page to display a second image corresponding to a second side of the printed page and rendering means for consecutively rendering individual representations of images of the page from a set of discrete representations one at a time to simulate the page being turned.

In the previous aspect, the rendering means may include creating means for creating an array of X, Y and Z first coordinates representing points on a grid in a three dimensional space, storing means for storing values in the array representing an image of the shape of the page at snapshots in time as the page is turned and dividing means for dividing the image of the page into a rectilinear grid of second coordinates of sub-images whose aspect ratios match the aspect ratio of a set of convex four-sided polygons bounded by said X, Y and Z coordinates, where upon the grid of second coordinates including a plurality of points A in one dimension and a plurality of second points B in another dimension, the number of rectilinear sub-images are substantially in accordance with the formula $(A-1)*(B-1)$. The system further includes texture-mapping means for texture mapping said grid of sub-images onto a set of convex four-sided polygons bounded by said first coordinate points.

The present invention also includes various aspects directed to a computer readable medium having computer instructions provided for thereon which enable a computer system to perform at least one of the method aspects described above.

These and other advantages and features of the invention will be apparent through the detailed description of the embodiments and the drawings attached hereto. It is also to be understood that both the foregoing general description and the following detailed description are exemplary and not restrictive of the scope of the invention.

BRIEF DESCRIPTION OF THE DRAWINGS

FIGS. 3A1–3H2, illustrate various aspects of viewpoints of a single-page display mode, with regard to page turning.

FIG. 4B illustrates a viewpoint of the printed publication of FIG. 4A, illustrating an unfolded gatefold page.

FIG. 11A illustrating the insert adjacent a right page and FIG. 11B illustrating the insert adjacent the left page.

DETAILED DESCRIPTION OF THE PREFERRED EMBODIMENTS

In the present invention, images of the pages of printed publications are electronically displayed in a unique manner which simulates the viewing of the publication as if the user where actually viewing a printed copy of the publication. Accordingly, the present invention discloses methods and systems in which a user may interact with an electronic copy of a printed document, including methods for animating the turning of pages as well as interacting with gatefold pages and card inserts positioned in the printed publication.

Figure 26:
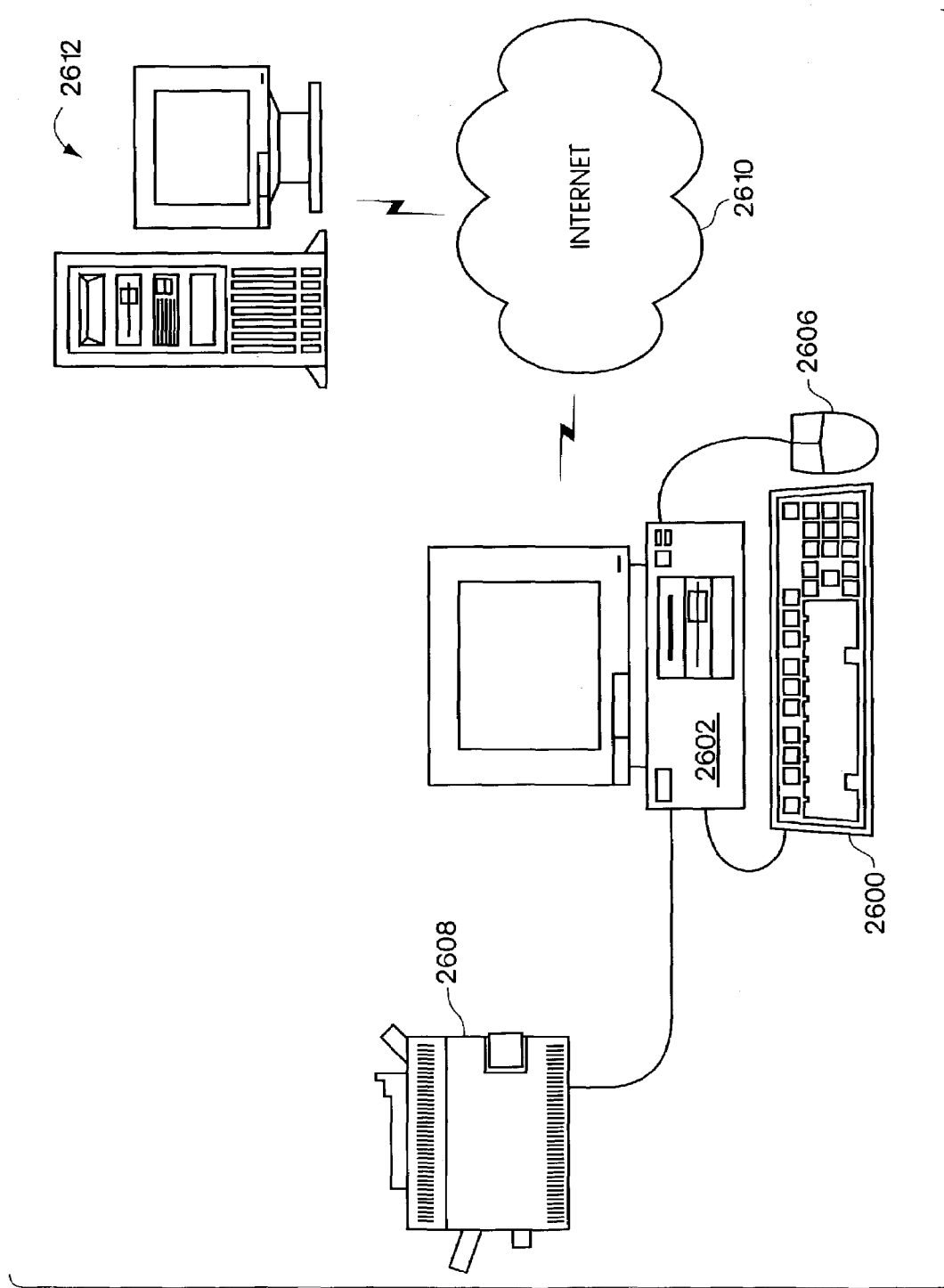
FIG. 26 illustrates a computer system for which embodiments of the present invention may operate.

The various embodiments and aspects according to the present invention may be performed on, for example, a desktop personal computer and a workstation, and may also be operated on any number of other computing devices including laptops, PDAs, cell phones, kiosks, and other digital and non-digital display devices. FIG. 26 illustrates an example computer system 2600 for the present invention, and includes a desktop PC 2602, with keyboard 2604 and mouse 2606, which may include one or more peripheral devices such as a printer 2608. The system may be in communication with a local area network (LAN) and/or the Internet 2610, which allows the desktop PC to access remote servers 2612.

Figure 1:
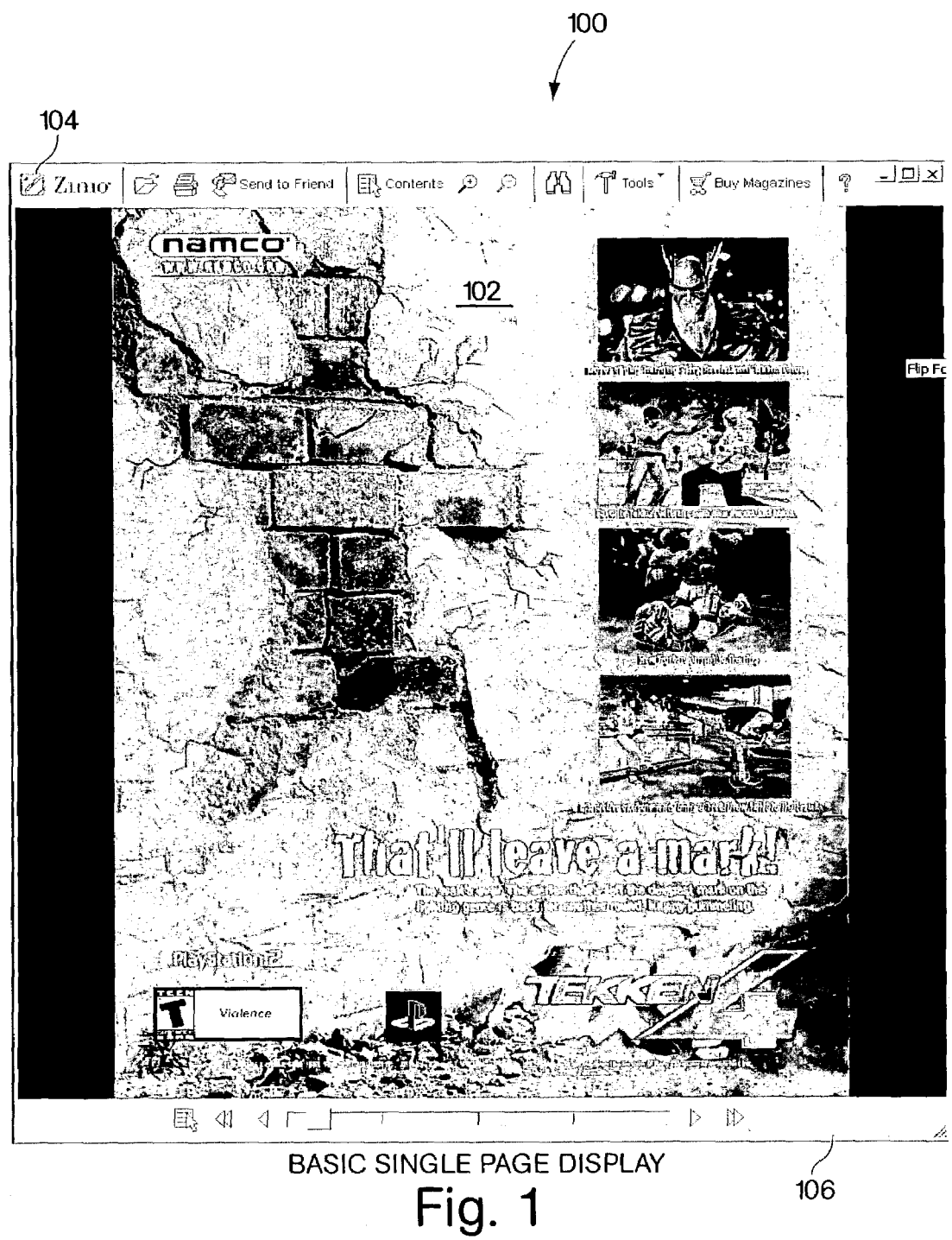
FIG. 1 is a screenshot of an image of a single page of a bound, printed publication as displayed by an application program according to the present invention.
Figure 2:
FIG. 2 is a screen shot of two images of facing pages of the bound printed publication as displayed by the application program according to the present invention.

FIG. 1 illustrates a screen shot 100 of an embodiment of the present invention. In particular, the screenshot of FIG. 1 shows a single page mode of an application program which displays an image of a single page of the printed publication. The application includes a display area 102, for displaying the image of a page or pages, a tool bar 104 which includes different tools for viewing, saving, opening printing and the like. The bottom of the page includes a page turning GUI 106, which allows a user to turn pages of the publication. Similarly, FIG. 2 illustrates a screenshot 200 of the application displaying two-pages, having corresponding portions 202, 204 and 206. Display area 202 includes an area for displaying a first page 208 and a second page 210.

Accordingly, the user of the methods and system according to the present invention has a choice of the single-page display mode (FIG. 1) and a double-page display mode (FIG. 2). In single-page mode, a single page of the bound printed matter is shown on the display at a time. In double-page mode, a left and a right page (e.g., facing pages) are shown side by side. The user may choose single-page mode to reserve a portion of the display for other functions, or may be viewing content on a portable device with a limited size screen or with an aspect ratio that's best suited to viewing a single page at a time.

In a preferred embodiment, it is also possible to choose a display window whose aspect ratio does not match the aspect ratio of the bound printed matter. For instance, the user may wish to have the image of the printed page fill the computer screen wider than it is tall as that of a publication whose aspect ratio matches that of 8½×11 paper. In such a situation, each page of the single-page publication display is scaled vertically to match the height of the display window, and then any unused area of the window is filled with a solid color (e.g. black), to simulate the publication resting on a solid surface.

Once the digital content is displayed for reading within the display area, clicking on special regions ("hot areas", edges, corners, screen corners, and the like) of the displayed page may activate functions that may be intuitive to the reader. For example, clicking on the right or left edges of the displayed page will cause the displayed pages to change, as in turning pages in print media. In a preferred embodiment, the display change is accompanied by an animation showing the turning of the page on the computer display. Depending on the capabilities of the computer or the display on which the user interface appears, the animation may not be displayed or the page content may be a generic page instead of the actual pages being displayed.

The page turning animation (also referred to herein as a "page flip animation") may be applied to six or more different modes: single-page mode with and without gatefold pages and/or card inserts and double-page mode with and without gatefold pages and/or card inserts. In both single and double-page display mode with gatefold pages, one or both, if double page mode, of the facing pages are obscured by folded-over "gatefold" page(s) which may be unfolded to reveal the page hidden underneath.

Within either display mode, page turning animation may simulate jumping forward and backward more than one page at a time by drawing/displaying the appropriate number of intermediate pages flipping in transition between the current page or pages and the destination page or pages, as will be described in more detail below.

In all of these modes, in order to calculate how to render the publication pages on the computer display, the preferred embodiment simulates a "bird's eye" viewpoint 302, looking down on the simulated printed matter from above, as shown in FIG. 3. The viewpoint mimics the viewpoint of a user viewing a magazine or other bound printed matter in the physical world.

In the single-page mode, page-turn animation, according to the FIGS. 3A1–3H2, proceeds as follows. On the first or (for example) the "front cover" page, clicking on the right-most edge of the page activates the "animation" page-flip effect 304 of the page, which reveals the "inside front cover" page (see FIGS. 3A1–3B2). Clicking on the right-most edge of this page causes the viewpoint to slide to the right in the direction of arrow B, creating an effect of the inside front cover page appearing to slide to the left and the page immediately to its right sliding in from the right (see FIGS. 3B1–3C2). Now clicking on the right-most edge of this page (FIG. 3C2) activates the page-flip animation 304 as well as a viewpoint pan to the left in the direction of arrow C. Because the page-flip animation also includes sliding the viewed page to the left (along with the viewpoint), this second viewpoint pan is generally not noticeable to the user. However, a subsequent click on the right-most edge of this third page will cause another camera pan to the right, to reveal a page to its right. From then on, all subsequent clicks on the right-most edges follow this pattern, until the user is viewing the very last page ("back cover") of the printed matter (see FIGS. 3D1–3E2). At this point, clicking on the right-most edge may activate the page-flip effect and reveal the front cover of the printed matter once more (see FIGS. 3E1–3E2). This sequence of page flip animations taken as a whole simulates the real-world experience of flipping forwards through bound, printed matter a page at a time.

Conversely, clicking on the left-most edge of the front cover slides the viewpoint to the left in the direction of arrow D, revealing the back cover page, as if the printed matter were folded open and laid flat with the cover and the back page both facing up. Clicking on the left-most edge of the back cover now activates the page-flip effect 304 and simultaneously slides the viewpoint to the right in the direction of arrow E, revealing the page previous to the back cover (the "inside back cover") (see FIGS. 3F1–3H2). Next, a click on the left-most edge of the inside back cover again slides the viewpoint to the left in the direction of arrow F. A click on this page's left-most edge activates the page-flip effect, simultaneously sliding the viewpoint to the right, and revealing the page previous to that page, etc. This sequence of page flip animations taken as a whole simulates the real-world experience of flipping backwards through bound, printed matter a page at a time.

In another embodiment of the invention, it may be desirable to change the order of the first few pages in order to show the user the back cover page immediately after the front-cover page, because exposure to content or publicity on the back cover is more highly valued by the publisher than content or publicity on the inside front cover. Although this order is not "natural" and perhaps less intuitive, in that it does not exactly simulate the physical experience of turning pages of bound printed matter, nonetheless it may be preferred in some applications. In such cases the page flip sequence proceeds as follows. Clicking on the right-most edge of the cover page slides the viewpoint to the left, revealing the back cover. Clicking on the right-most edge of the back cover now activates the page-flip effect with simultaneous viewpoint slide to the left, revealing the inside front cover.

On the other hand, for example, clicking on the left-most edge of the cover page slides the viewpoint to the left, revealing the back cover, and clicking the left-most edge of the back cover subsequently reveals the inside back cover. Accordingly, an ambiguous situation may arise when arriving at the back cover page. It is possible to arrive at the back cover by clicking on the right-most edge of the front cover, or by clicking on the right-most edge of the inside back cover. Clicking on the left-most edge of the back cover may return the user (for example) to either the front cover or the inside back cover. In a preferred embodiment of the invention a finite-state machine algorithm, as known in the art, may be employed to track whether a user has arrived at the back cover page via the front cover or via the inside back cover, and handle a left-most edge click accordingly. Other such algorithms may be used to track the users viewing habits of the images of the printed publication.

It will be appreciated that the action of clicking the right-most edge of a displayed page, also known as "clicking forwards", may be equivalently actuated by using input via, for example, a computer keyboard by pressing the right-arrow indicator or the space key, or by positioning a mouse cursor over a hot spot on a page edge or a right-arrow icon on the display, and clicking the mouse button. Similarly, the action of clicking the left-most edge, also known as "clicking backwards", may be equivalently actuated by pressing the left-arrow indicator on a computer keyboard, or by positioning a mouse cursor over a hot spot on a page edge or a left-arrow icon on the display, and clicking the mouse button. To that end, the initiation of page turning may be set up using any key(s) on a keyboard or other input device.

A second mode of page turning is generally employed when displaying two pages of bound printed matter side-by-side on a display (e.g., facing pages)(see FIG. 2, for example) and operates in a similar fashion to single page display mode. Accordingly, at the outset, the front cover page is displayed on the right side of the display, and the back cover is displayed on the left side of the display, as if the bound printed matter were lying flat and open on a surface with the viewpoint looking down upon both pages. Clicking on the right-most edge of the cover page activates a right-to-left page-flip animation that reveals the inside front cover and the next page after that, displayed on the left and right sides of the screen, respectively. Subsequent clicks on the right-most edge of the rightmost page produce a parallel result, until the last two pages are displayed. In a preferred embodiment, the next click on the right-most edge of the last page of the bound printed matter activates a reverse page-flip (i.e., left-to-right) animation and once more reveals the back cover, displayed on the left side of the display, and the front cover on the right side of the display. However, in another embodiment, clicking on the right-most edge of the last page of the bound printed matter may also activate a right-to-left page-flip animation. Note that in all the embodiments of the side-by-side animations, there is generally no need to move the viewpoint's position, as two pages can be seen at all times. Additionally, since the back cover may be visible as well as the front cover, at the outset, there may be no need to change the order of pages from the "natural" order in order to increase back cover exposure (as is generally the case in single page mode). Accordingly, FIGS. 17–25, illustrate evolving screenshots of an example of a right-to-left page turning animation/simulation for a two-page display mode according to embodiments of the present invention.

A third mode of page turning is employed when "gatefold" pages are to be displayed as shown in FIGS. 4–10. Gatefold pages may be generally described as a page that is wider and/or taller than a standard page of a printed publication, which is folded so that it fits within the printed publication, and/or which the folded portion generally obscures a second portion of the page when folded. Gatefold pages generally unfold away from the spine of the printed matter, i.e. they are folded along the outermost edge of a page (opposite the spine). Such gatefolds are common in consumer magazines. They do not always equal double the width of one page in the publication—sometimes they may be narrower and they may also be wider—e.g., they foldout twice or more. However, they always obscure at least a portion of a page when "folded closed", and are frequently printed on both sides in order to display information when both "folded closed" and "unfolded". Some gatefold pages may appear as part of the cover page, some may appear as part of the inside-back cover, and some may appear in the interior. In the last case, there may be just one gatefold on the left or right side, or two gatefolds, one on each side.

Figure 4A:
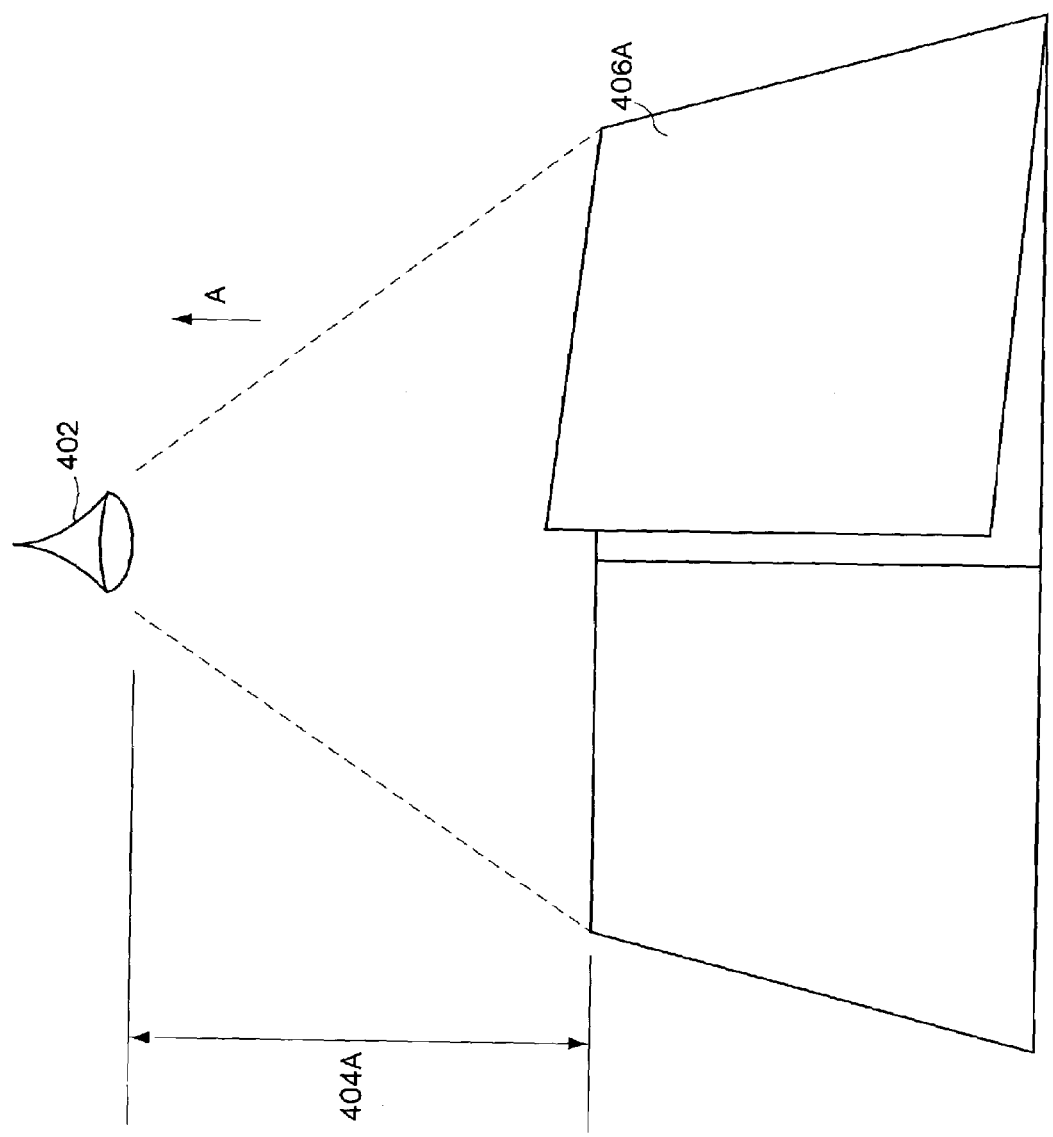
FIG. 4A illustrates a viewpoint of a printed publication having facing pages and a right gatefold page (folded).

Because unfolding the gatefold or gatefolds causes the overall width of the displayed printed matter to change, extra considerations must be made for them. Specifically, if the user has chosen a two page "side-by-side" viewing mode, then when a gatefold page is displayed which obscures the page on the left, the user generally has two options depending on which side of the gatefold they choose to click. In a preferred embodiment, choosing the right-most edge causes the gatefold page to unfold towards the left. As shown in FIGS. 4A–4B, an unfolding process of a gatefold page 406A may be accomplished by first moving the viewpoint 402 from a first virtual distance 404A to a second virtual distance 404B, producing a "zoom-out" effect in a direction A, making the overall page size smaller on the display, and then displaying a right-to-left page-flip animation. The effect of the zoom-out animation is to permit the user to see the inside of the gatefold page, the page that the gatefold page obscured (the left-most page), and the right-most page all at once. Now clicking on the left-most edge of the unfolded gatefold page, or alternatively the right edge of the left-hand page, causes the gatefold page to "refold" using a page-flip animation and the viewpoint to simultaneously move closer to the printed matter ("zoom-in"), once again completely fitting just two pages into the display. On the other hand, clicking on the right-most edge of the unfolded gatefold page has no effect.

When a gatefold page is obscuring a page on the right, the user also has the option (for example) of clicking on the left-most edge of the gatefold page or on the right-most edge. Clicking on the left-most edge causes the gatefold page to unfold towards the right via a left-to-right page-flip animation, followed by a viewpoint zoom-out. At this stage, both the reverse side of the gatefold page and the right-most page become visible, as well as either a left-most page or a left-most gatefold page. Now clicking on the right-most edge of the unfolded gatefold page, or alternatively the left edge of the right-hand page, causes the gatefold page to "refold" using a page-flip animation followed by a viewpoint "zoom-in", once again completely fitting just two pages into the display. However, clicking on the left-most edge of the unfolded gatefold page has no effect.

Figure 5:
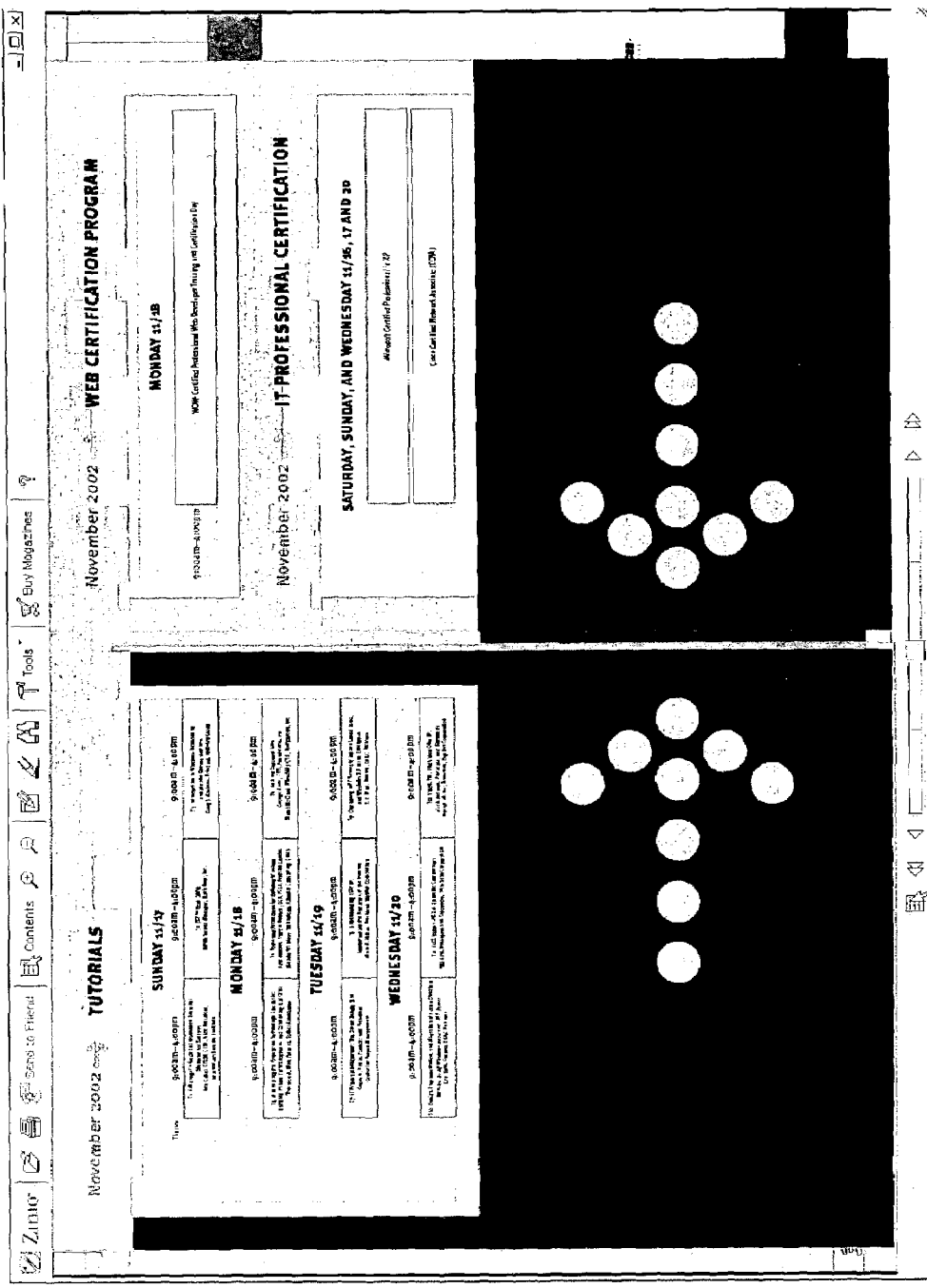
FIG. 5 is a screen shot of images of two facing pages (for example) of a bound, printed publication, having left and right gatefold pages (folded) which obscure a portions of the pages currently displayed.
Figure 6:
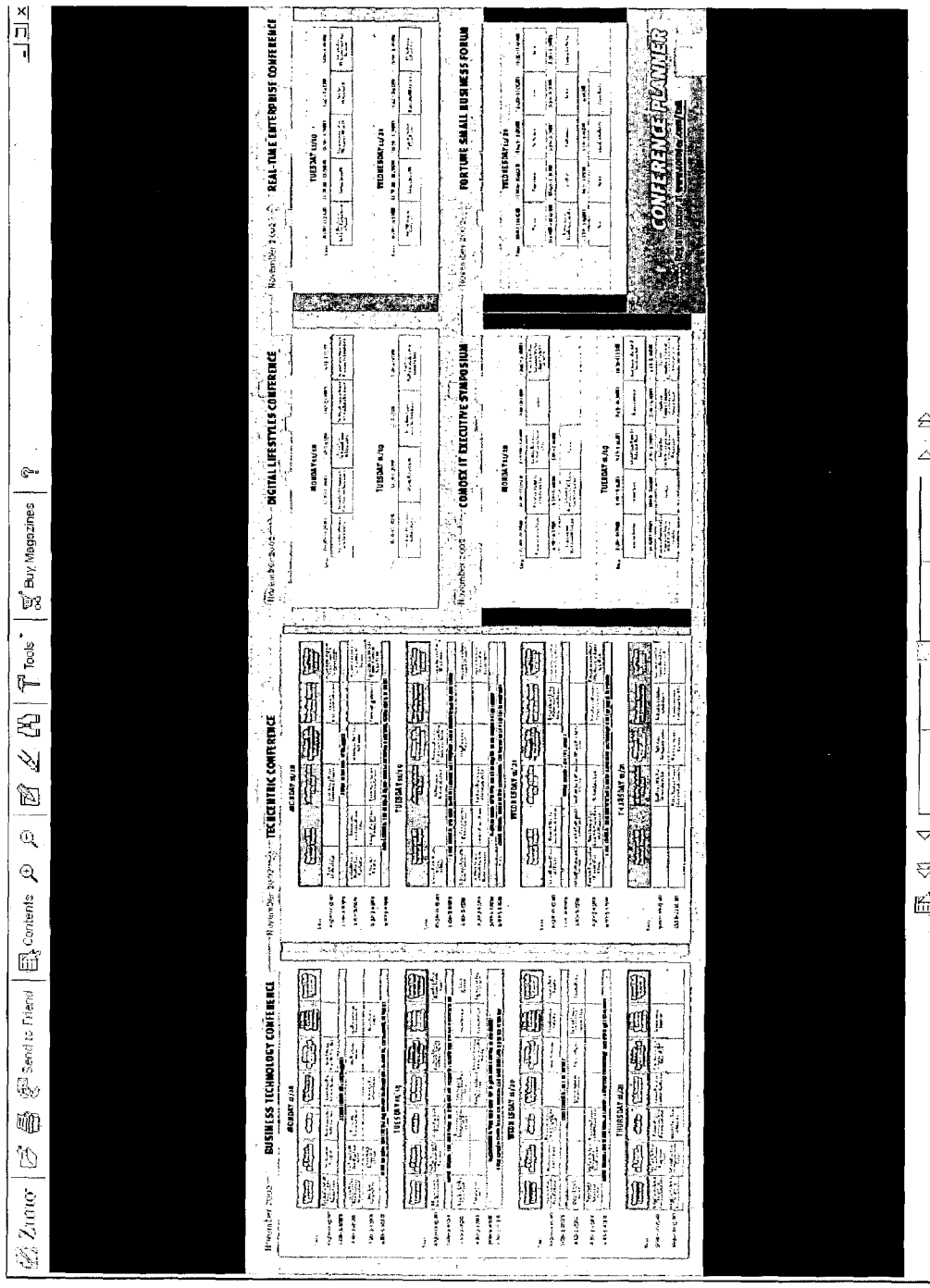
FIG. 6 is a screenshot of images of the two facing pages of FIG. 5, with the gatefold pages unfolded.
Figure 7:
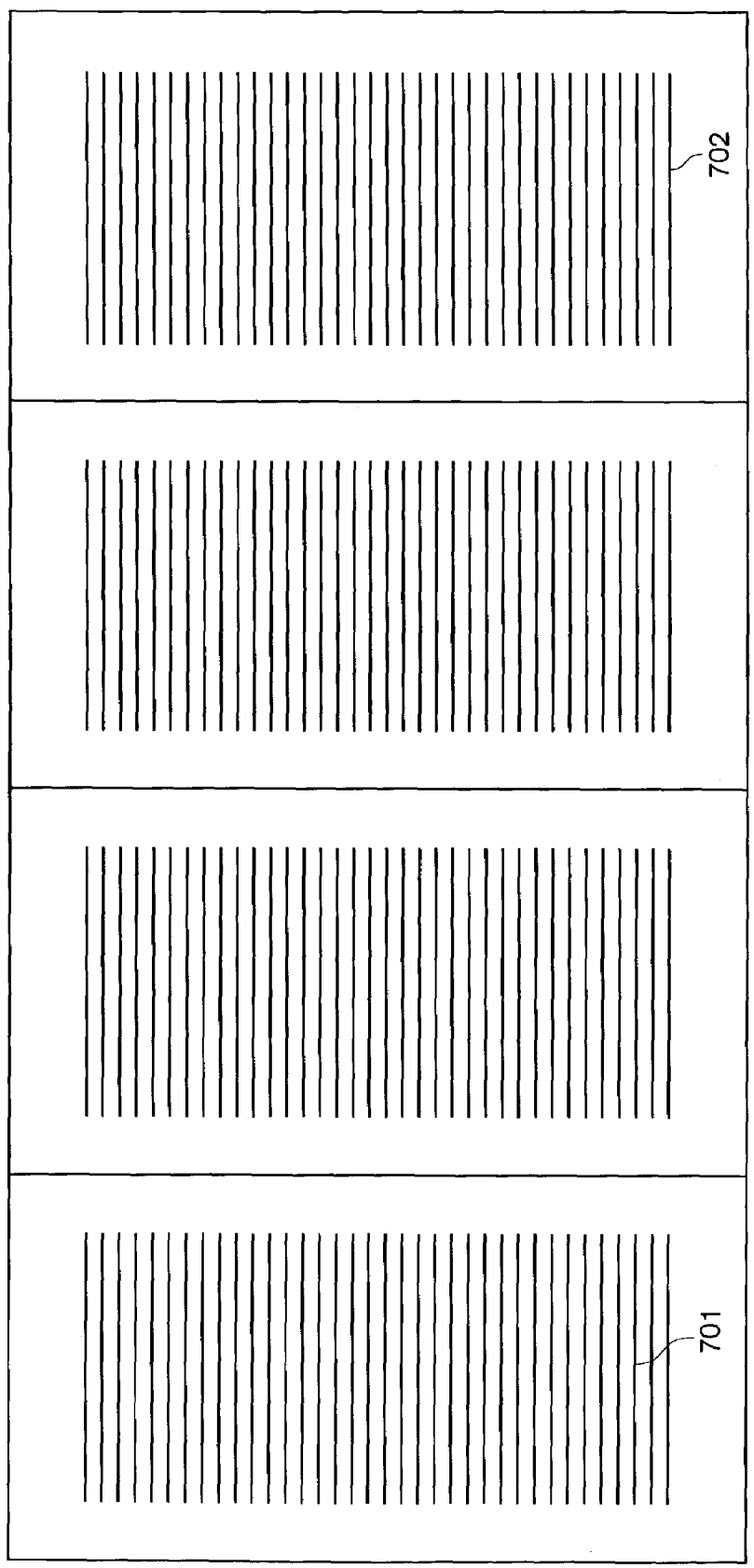
FIG. 7 is a line drawing depicting the unfolded gatefold pages of FIGS. 5 and 6.

In a preferred embodiment, it is also possible to view two gatefold pages, one obscuring the left-most page, and one obscuring the right as shown in FIGS. 5–7. There are generally two methods for unfolding the gatefold pages is such an embodiment. In a first method, once the left gatefold page 701 has been unfolded, it is possible to click on the left-most edge of the folded right gatefold page 702. This activates an additional zoom-out animation followed by a left-to-right page-flip animation, revealing the right side page as well as the inside page of the rightmost gatefold (see FIG. 6). The zoom-out animation is generally necessary because with both gatefold pages unfolded, four pages must be made visible simultaneously. Similarly, when the right gatefold page is already unfolded, it is possible to click on the right-most edge of a still unfolded left-most gatefold page, activating an additional zoom-out animation followed by a right-to-left page flip animation, revealing the left most page as well as the inside page of the leftmost gatefold.

Figure 8:
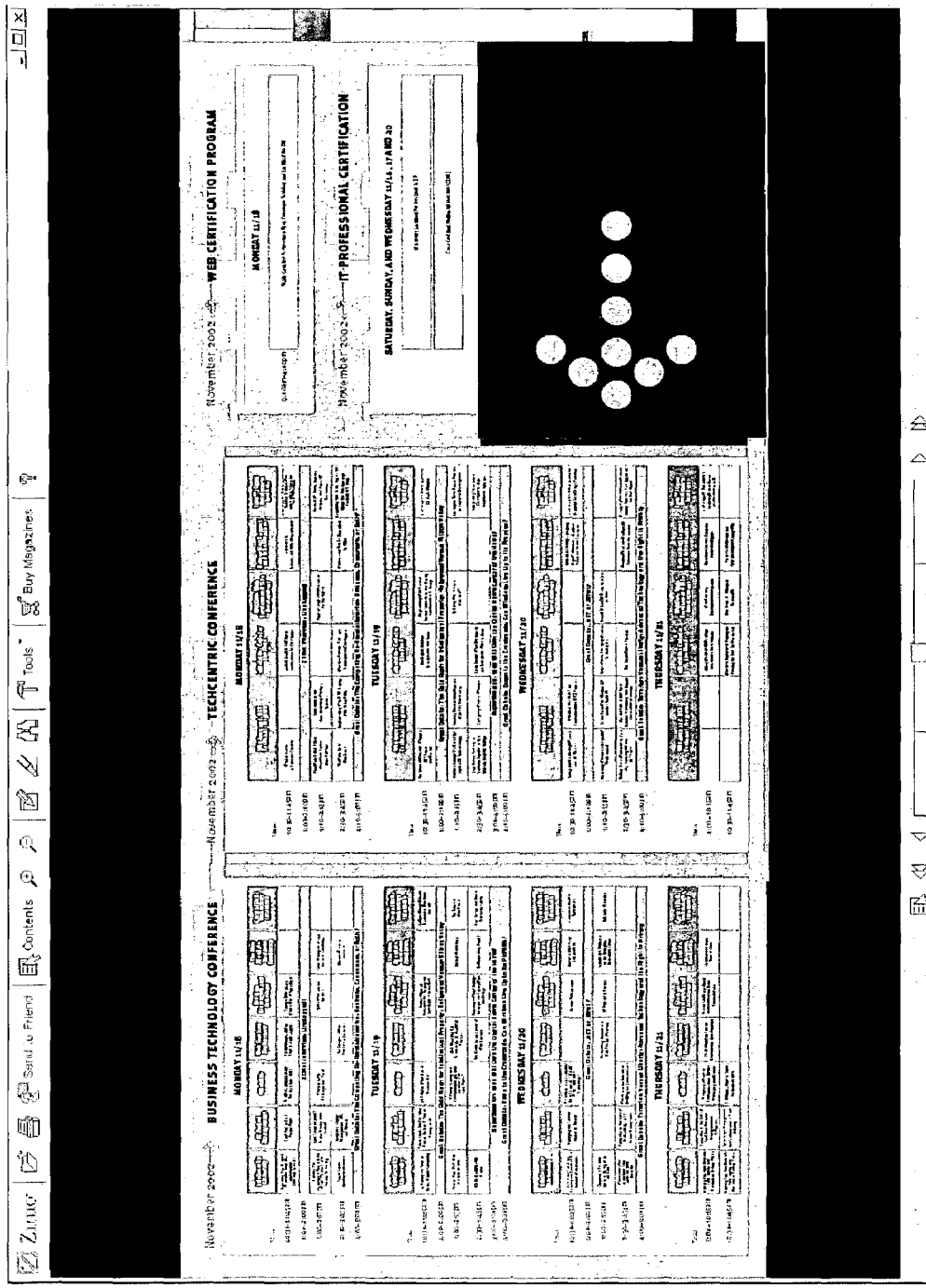
FIG. 8 is a screenshot of the pages displayed of FIGS. 5 and 6, with only the left hand gatefold page unfolded.
Figure 9:
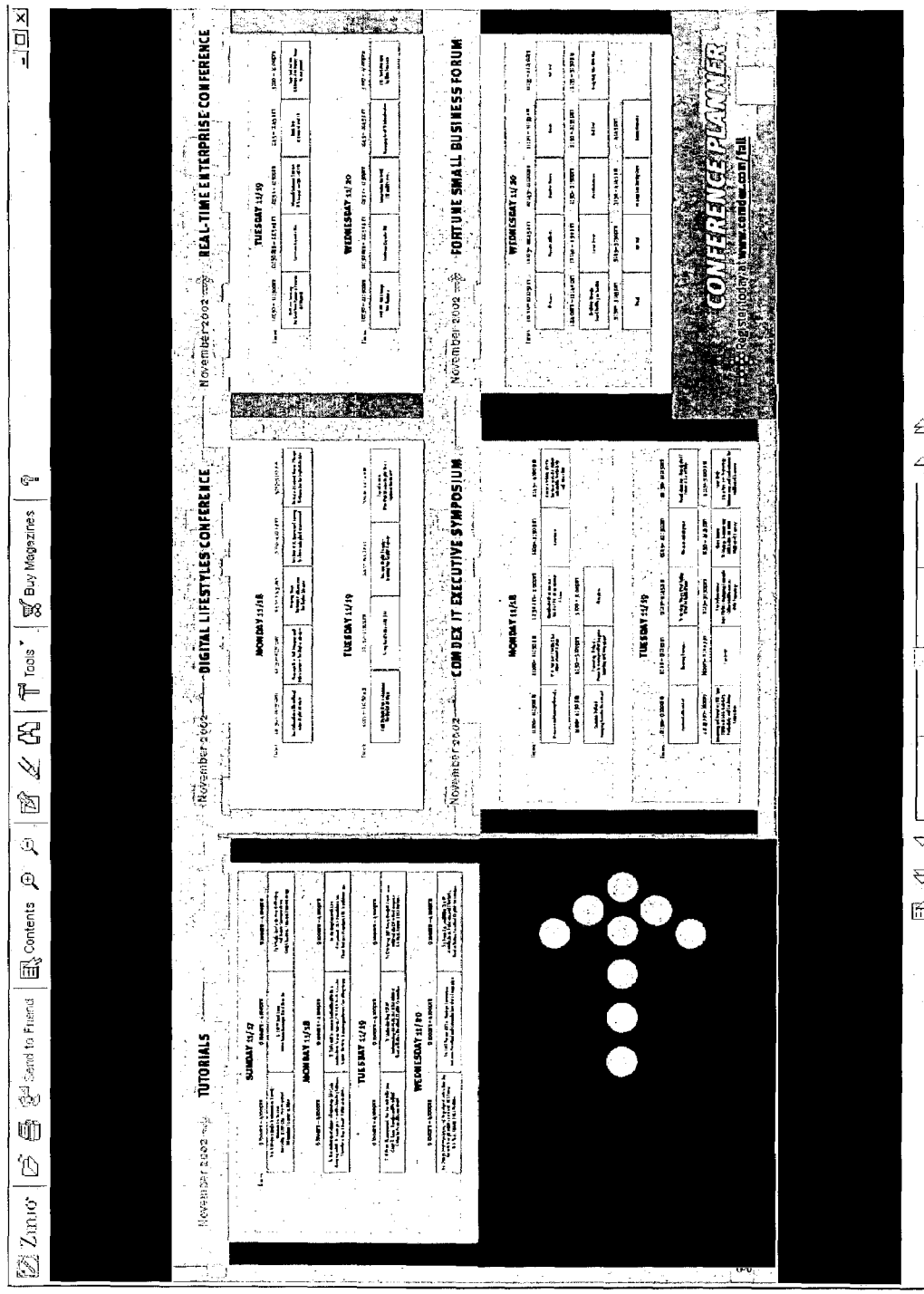
FIG. 9 is a screenshot of the pages displayed in FIGS. 5 and 6, with only the right hand gatefold page unfolded.

When two gatefold pages are unfolded completely, clicking on the left-most edge of the left-most, unfolded, gatefold, or the right-most edge of the right-most, unfolded, gatefold page, may produce different results. For example, clicking on either one of these edges causes the corresponding gatefold to refold using a page-flip animation followed by a zoom-in animation. Alternatively, clicking on the either of these edges may cause both the left-most and right-most gatefold pages to refold using a page-flip animation, followed by a zoom-in operation (which may include two-zoom in operations) resulting in two pages now completely filling the display. Still further yet, for example, clicking on the left-most edge of the left gatefold page causes both the left-most and right-most gatefold pages to refold, activates a zoom-in operation (or two) and finally deploys a left-to-right page-flip animation, to reveal the two pages that precede the pages with the gatefolds (FIG. 5, for example). In yet another example, clicking on the rightmost edge of the left gatefold page causes both the left-most and right-most gatefold pages to refold, a zoom-in operation (or two) and finally a right-to-left page-flip animation to the left, revealing the two pages that follow the pages with the gatefolds. FIGS. 8 and 9 generally illustrate a left gatefold page unfolded (FIG. 8) and a right gatefold page unfolded (FIG. 9).

Figure 10:
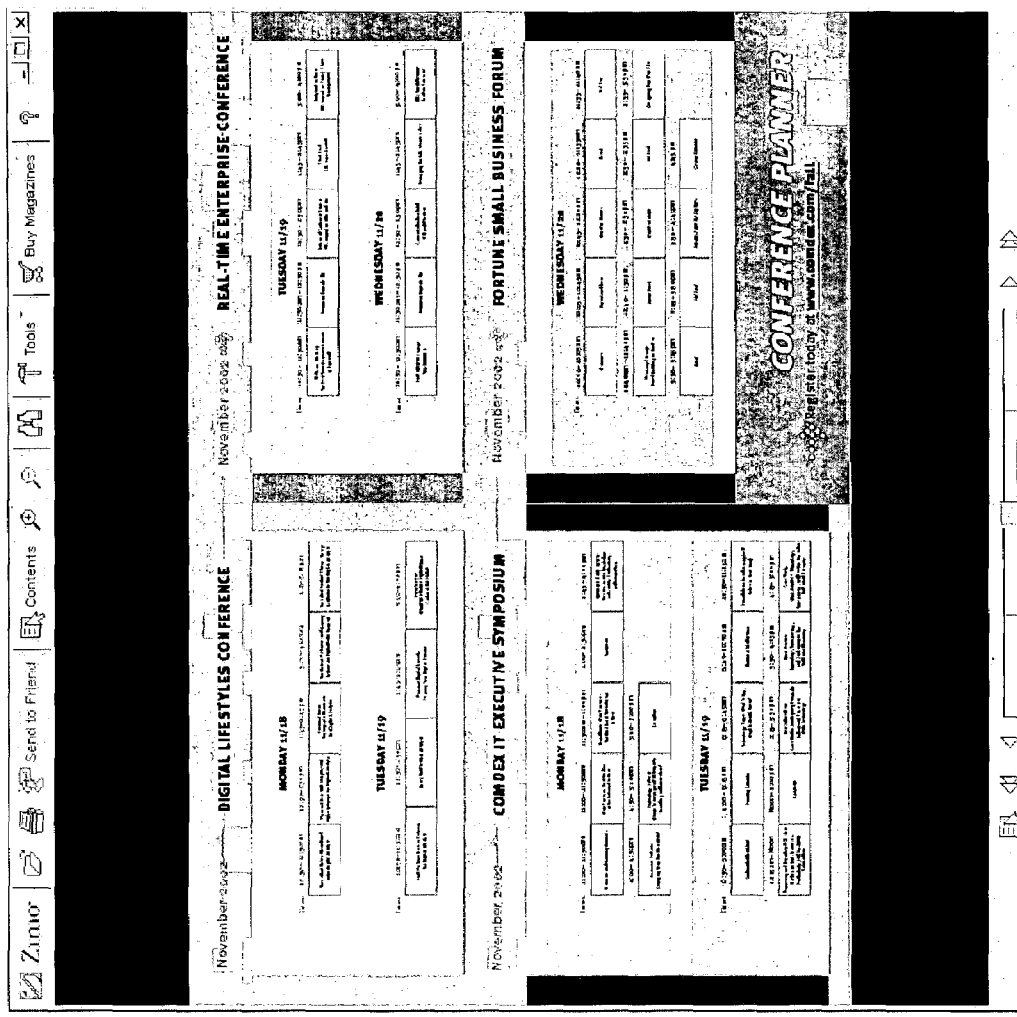
FIG. 10 is a screenshot of the right hand page of FIGS. 5 and 6, in single-page display mode, shown with the corresponding unfolded gatefold page.

Handling gatefold pages when the display is only as wide as a single page requires variations on the techniques outlined above for two-page displays examples of which are illustrated in FIG. 10. For instance, when a left-side page is displayed with a gatefold page over it, clicking on the right-most edge of the gatefold page launches a zoom-out animation followed by a right-to-left page-flip animation unfolding the gatefold to the left. Now, clicking on the left-most edge of the gate-fold page launches a left-to-right page-flip animation refolding the gatefold page, a zoom-in animation, and another page-flip animation revealing the page previous to the gate-fold page. On the other hand, clicking on the right-most edge of the revealed (left-most) page may launch a page-flip animation refolding the gate-fold-page, a zoom-in animation, and a viewpoint-slide to the right revealing either a page to the right of the gatefold page, or if that page itself contains a gatefold page, then a zoom-out animation followed by page-flip animation unfolding that gatefold page. Clicking on the right-most edge of this second gatefold page may launch a page-flip animation that refolds the gatefold, followed by a zoom-in animation, and a page-flip animation to reveal the page immediately following this second gatefold page. Conversely, clicking on the left-most edge of this second gatefold page reverses the process: it launches a page-flip animation that refolds the second gatefold, zooms in on the gatefold page, slides the viewpoint to the left to reveal the left gatefold page, zooms out, and then launches a page-flip animation that reveals the first gatefold animation.

In another embodiment of single page mode with gatefold pages, zoom-in animations between facing gatefold pages are not necessary. Specifically, the viewpoint remains zoomed-out. Instead, the left or right gatefold page is refolded with a page-flip animation, the viewpoint pans left or right, and finally the opposite gatefold page is unfolded.

Figure 11B:
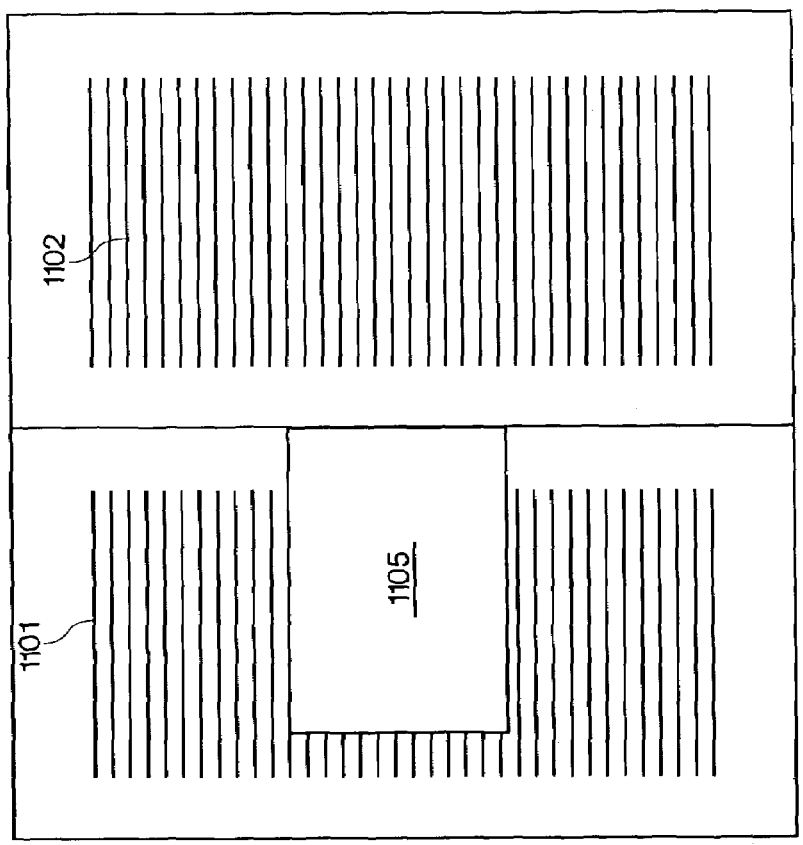
FIGS. 11A and 11B illustrate line drawing examples of views of insert cards (in a two page display mode for example) placed between facing pages of a bound, printed publication.
Figure 11A:
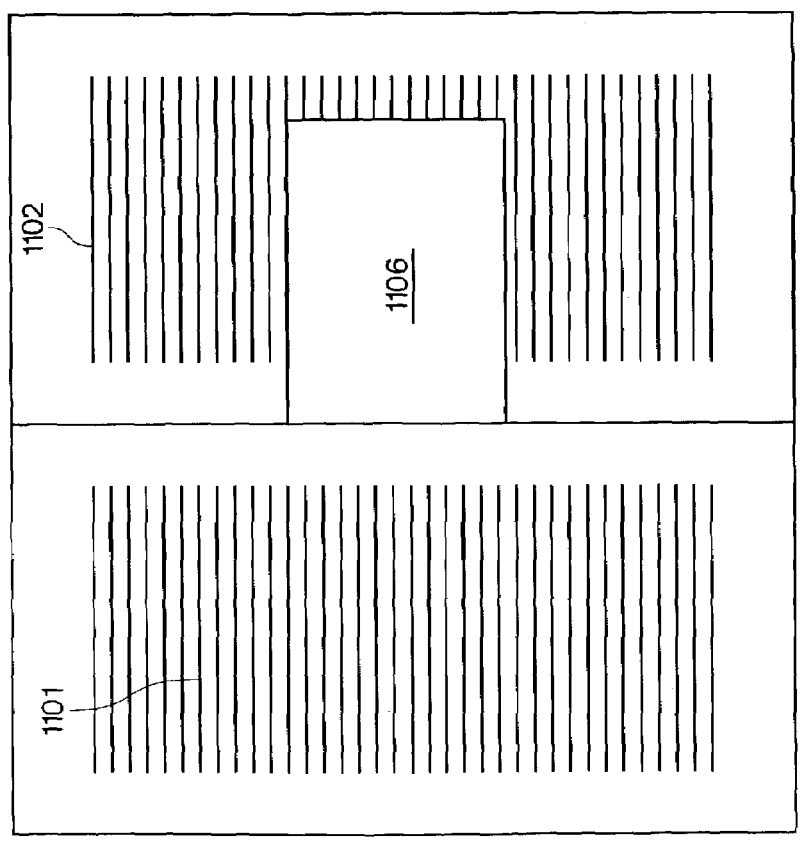
Figure 12:
FIG. 12 is a screenshot of a two page mode display of images of facing pages of a printed publication, illustrating an insert card positioned adjacent the right hand page.
Figure 13:
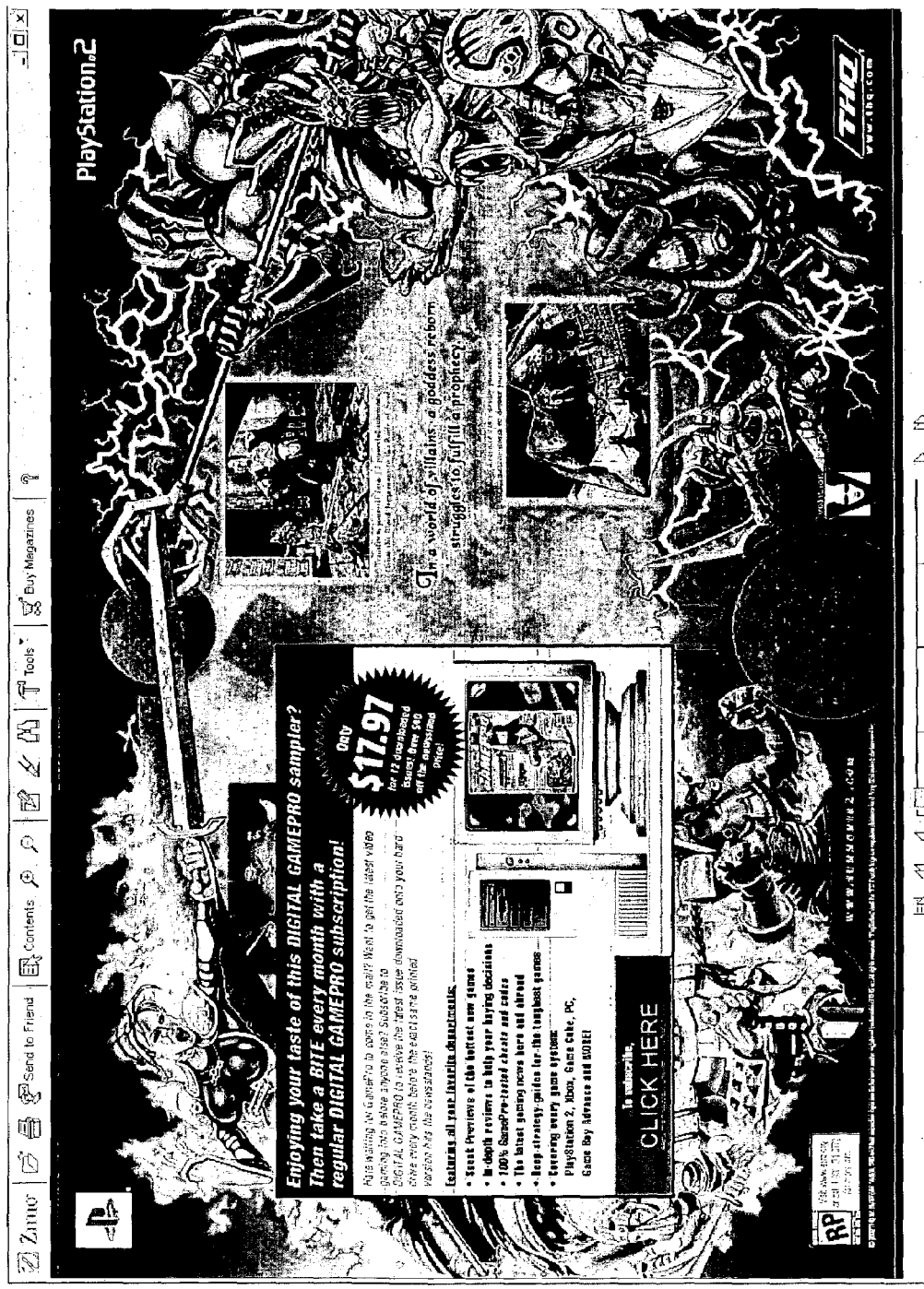
FIG. 13 is a screenshot of the same two page mode display depicted in FIG. 12, but with the insert card positioned adjacent the left hand page.
Figure 14:
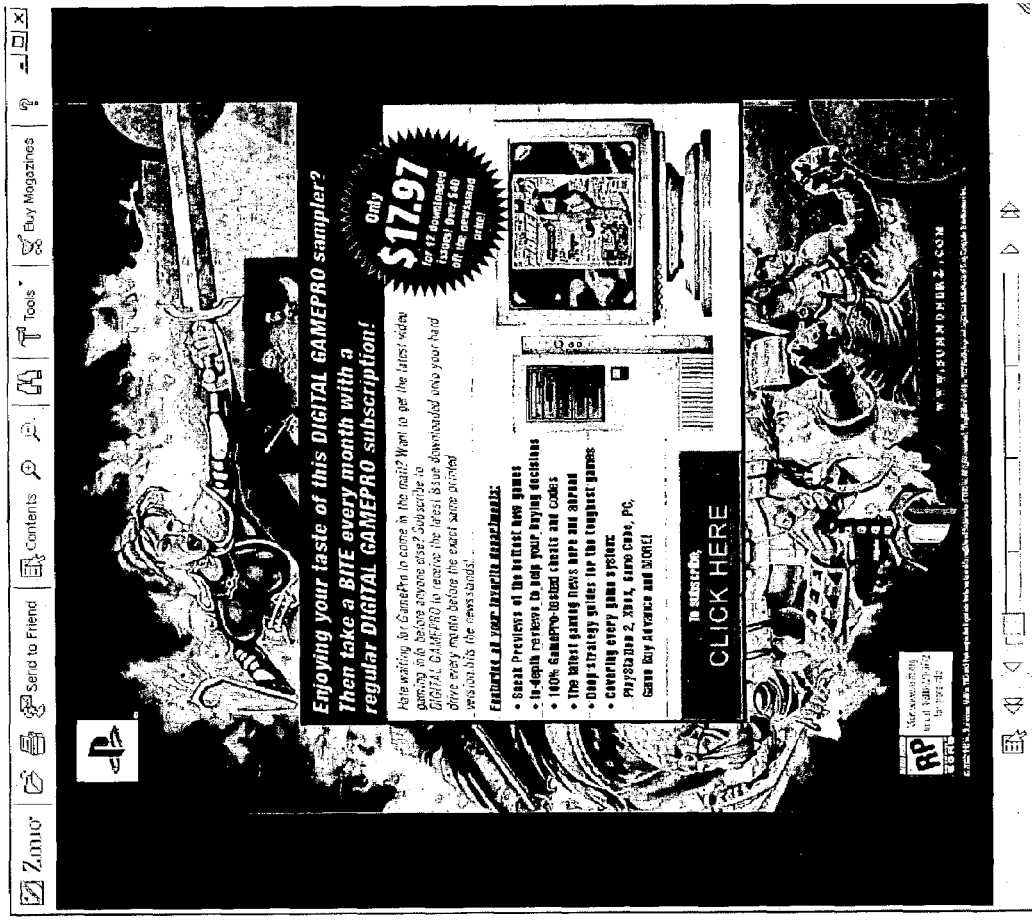
FIG. 14 is a screenshot of a single-page mode display of an image of a page of a printed publication with an insert card.

In certain cases a publisher adds inserts of a different, smaller size to a publication, for instance, for advertising, subscription solicitation, or reader feedback as shown in FIGS. 11–14 (double page display mode, FIGS. 11–13; single page display mode FIG. 14). Inserts may generally be described, for example, as a page that is generally smaller than the standard format page for the respective printed publication, and obscures a portion of an adjacent page. Preferably, the insert cards (often called "blow-in" or "reply" cards) are sized to be about (generally) 3"×5" or thereabouts. Accordingly, as shown, for example, in FIG. 11, illustrating, double-page display, an insert showing a first side 1106, between left hand page 1101 and right hand page 1102, and then a second side 1105.

It is important that a user be able to see both sides of such an insert and, by employing the page flip animation scaled appropriately to match the side of the insert. A preferred embodiment of the present invention can simulate the physical aspects of these cards. For example, the insert can be "flipped-over" by clicking on the right-most corner of the insert, and the page-flip animation reflects the actual motion of a physical insert card that is bound into the publication. In another embodiment of the invention, any clicks to the page behind the insert apply first to the insert, thus obliging a user to first view the reverse side of the insert before advancing to the next two pages of a publication. This provides some advantage to a publisher who wishes to ensure that certain content or advertising is viewed. In single page view, the insert is "flipped-over" in the absence of the page hidden behind it.

In another embodiment of the invention, the user can "zoom-in" and "zoom-out" on the page or pages being displayed, in order to get a closer look. When an insert card is present, the invention may need to move the insert card aside in order for the user to view what is underneath it. To accomplish this, a page-flip animation to the left may be launched on the insert card to flip it to the left side of the publication if the user chooses to zoom in on a portion of the right-most page and the insert card is currently obscuring any portion of the right-most page. Conversely, if the user zooms in on the left-most page, a page-flip animation to the right is launched if the card obscures any portion of the left-most page.

One skilled in the art will appreciate that the insert cards as defined in the present invention may also be positioned on the outside of the printed publication, which may obscure a portion of the front and or back cover.

Animation Mesh Description

In a preferred embodiment of the present invention, the page flipping animation is accomplished in the following manner. A discrete mesh is generated, represented inside a computer program by an array of X, Y, and Z coordinates representing points in space. Each coordinate in the array reflects the position of one node in a rectilinear grid whose dimensions can be varied, to best suit the power of any particular computer and calculation speed and desired realism of the page-flip animation. For instance, on a powerful computer, the grid's dimensions may be twice those of an average computer, resulting in a more realistic curving effect of the page being turned.

Figure 15:
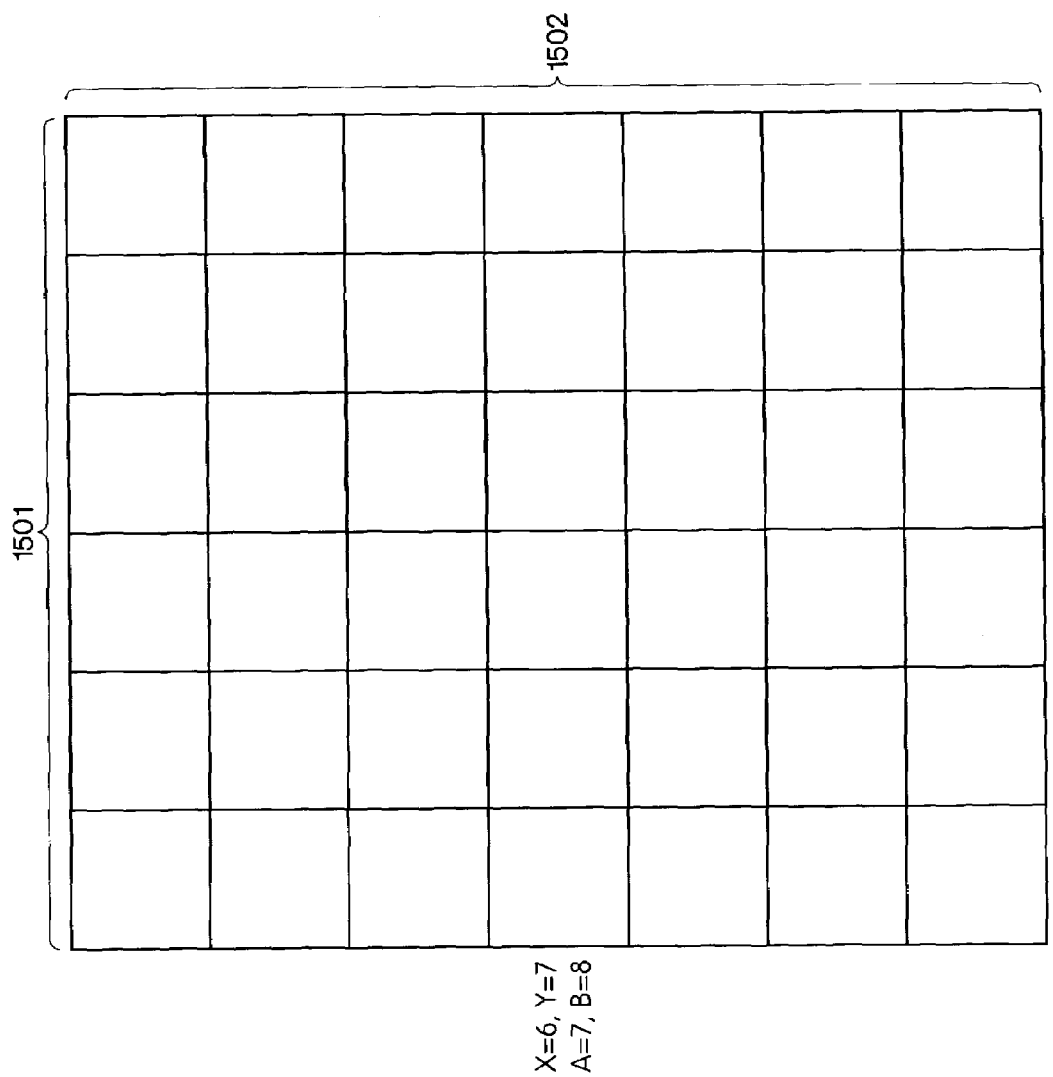
FIG. 15 is a line drawing of rectilinear grid for simulating page animations.
Figure 16:
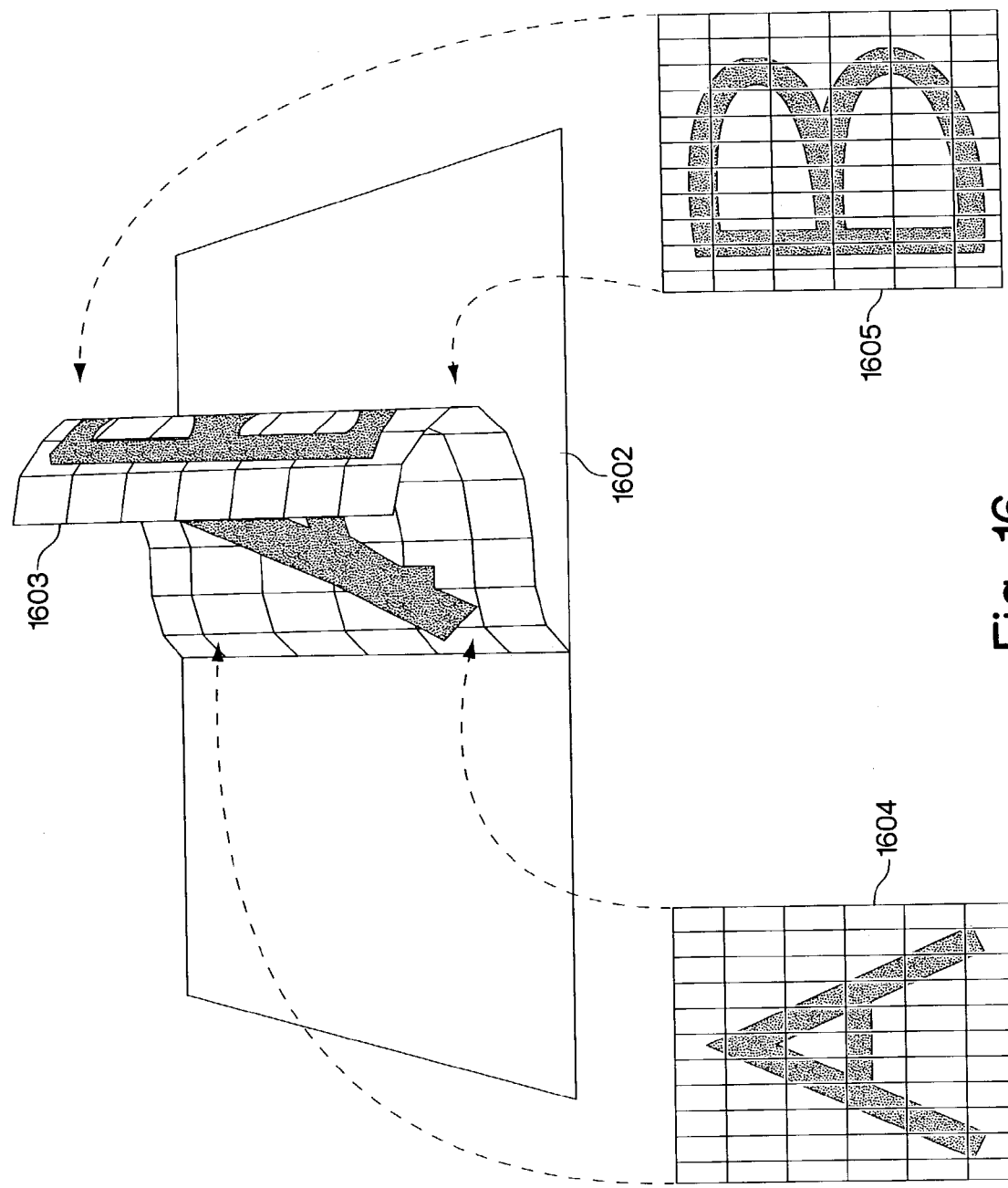
FIG. 16 is a line drawing illustrating the process of the page turning animation according to the present invention.
Figure 17:
FIGS. 17–25 are screenshots of an evolving page-flip animation for a two-page display mode of an embodiment according to the present invention.
Figure 18:
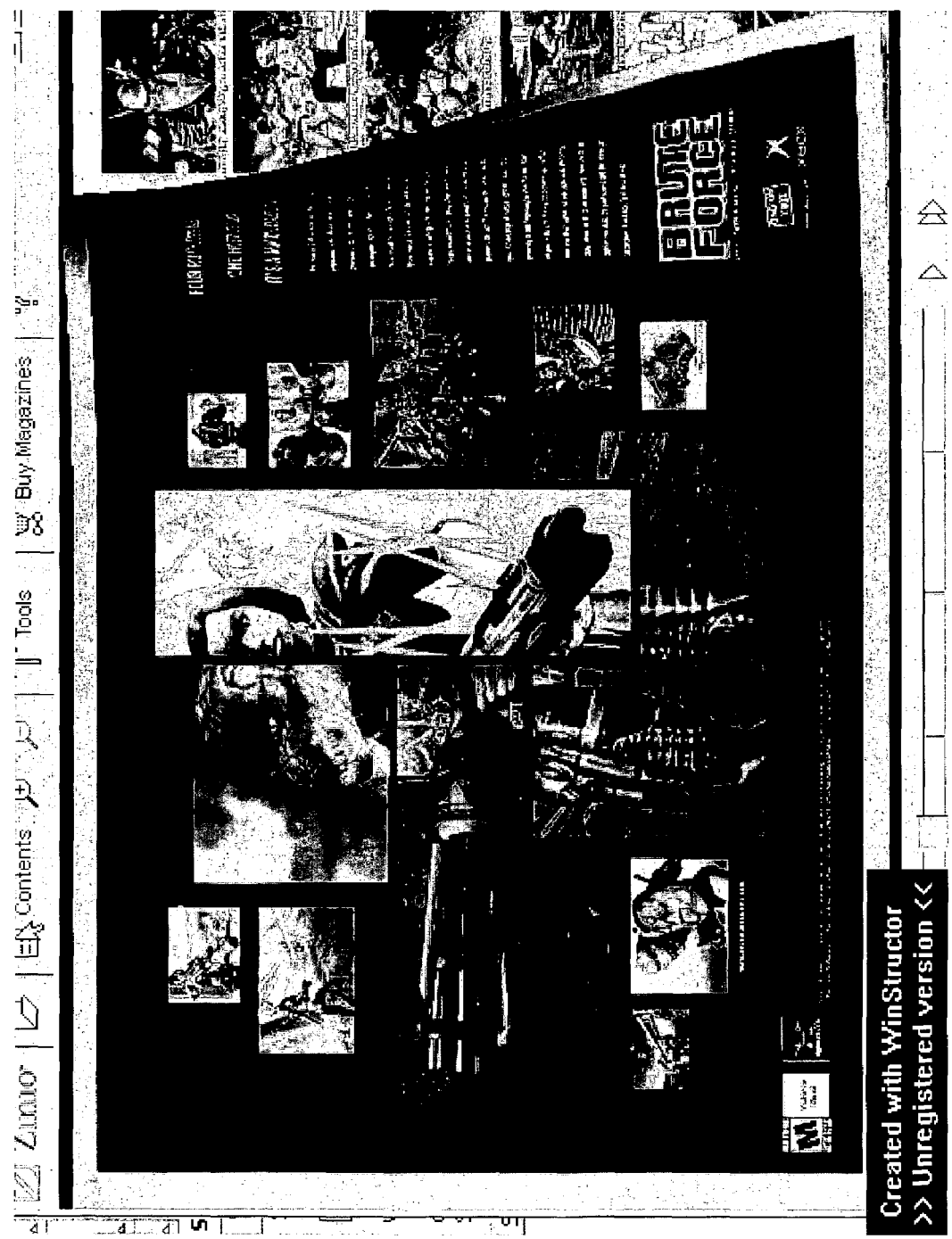
Figure 19:
Figure 20:
Figure 21:
Figure 22:
Figure 23:
Figure 24:
Figure 25:
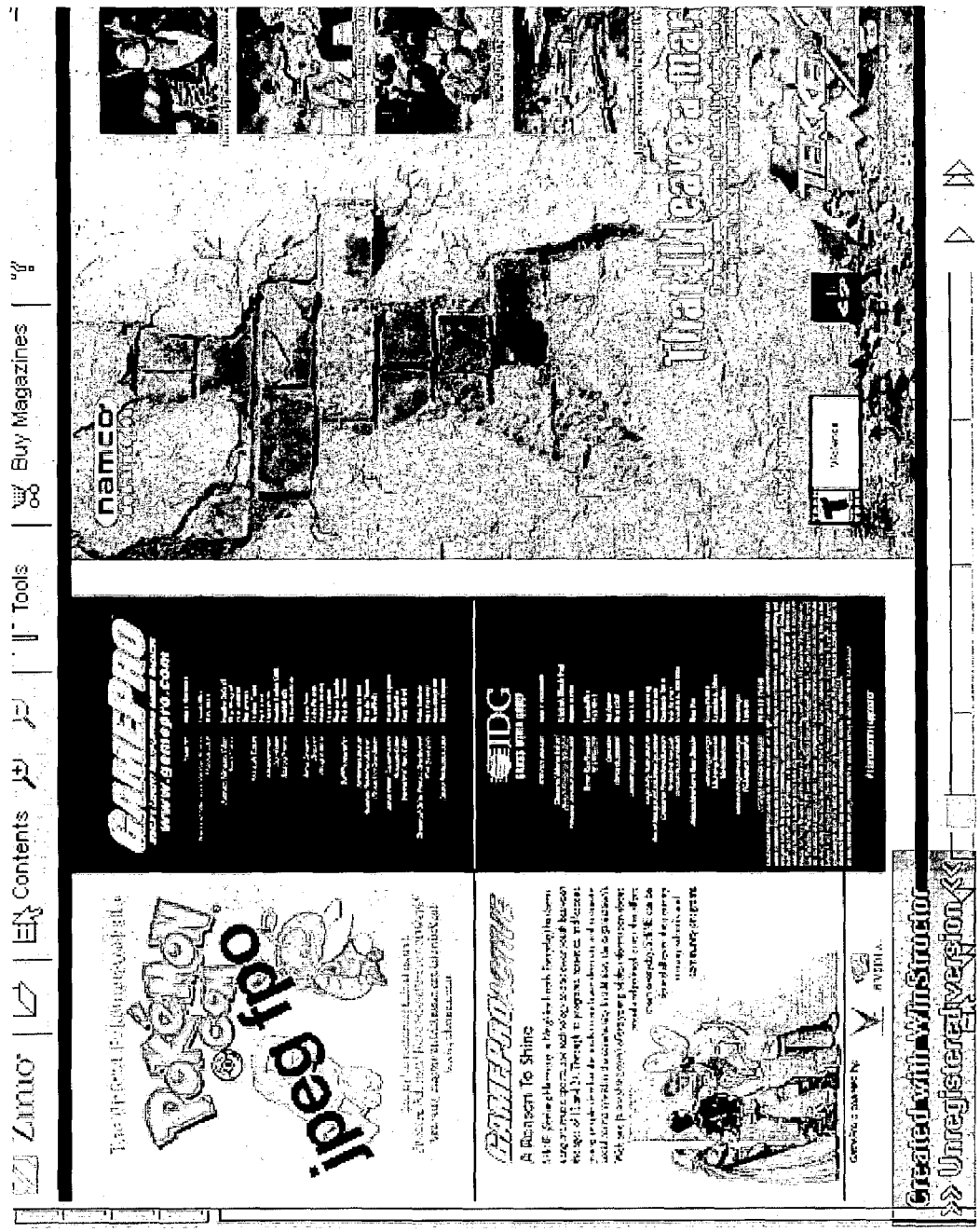

In order to simulate one type of page-flip animation, for example from right-to-left, in a preferred embodiment of the present invention, the algorithm relies on a sequence of grids (see FIGS. 15–16), each representing an intermediate form of the page as it is turned. In order to render these intermediate forms, each transformation of the grid is used to build a set of four sided polygons. Three-dimensional rendering libraries and hardware, as is known in the art, are then informed of the position and orientation of each of the polygons; subsequently, the libraries and the hardware are instructed to render each polygon onto the display to display one frame in a page-flip animation.

The libraries are additionally instructed to apply as a texture map, as is known in the art, an image of the front side of the page to be turned and its reverse side onto the grid as follows. The image of the front side of the page is subdivided into rectangular sub-images that will map directly to the grid; for instance, if the grid is a points across and b points down, then the image will be subdivided into (a−1)*(b−1) rectangles (see 1501–1502, FIG. 15), whose aspect ratios match the proportionate distance between the grid coordinates. Each sub-image is then applied as a texture map to the polygon that stretches between the corresponding grid points. The image of the reverse side of the same page is also subdivided in the same manner and applied as texture maps to the reverse side of similarly corresponding polygon. An example of the page flipping animation is provided in FIG. 16, where one side 1604 of a page 1603 is shown approximately midway through a page turning animation, to reveal a second side 1605 of page 1603 of publication 1602.

Although the polygons in the grid transformations may not be rectangular, they are designed such that they preferably have four sides and are convex. This constraint makes it possible for the three-dimensional rendering library and hardware to mathematically map the rectangular sub-images created from the front and rear side images of the turned page to the polygons in the grid transformations. The algorithm used to map a texture from an rectilinearly bounded image to one that has sides at arbitrary angles is known in the art and will not be discussed here, and in fact, is commonly and automatically implemented by today's three-dimensional rendering libraries and hardware. A sample of a result of the page-flip animation are shown in FIGS. 17–25 which depict screenshots of an actual page flip animation in a two-page display mode.

The advantage of this approach may be seen at multiple levels. First, by using a true three-dimensional representation of the page as it is being turned, the present invention may easily scale the grid to fit any page format as needed. In addition, sets of grid transformations with more or fewer grid points can be deployed as appropriate to the particular power of rendering hardware employed on the display device. Using fewer grid points results in fewer polygons and fewer texture map calculations, and thus increased rendering speed; however, the page looks less and less like a curved piece of paper and more like a set of stiff cards connected at their edges. A user could also elect higher grid resolutions and better looking (if slower) page turn animations, or alternatively coarser grids with faster page turn animations.

More important than these considerations is that the grid transformation data can be updated to reflect multiple page turn effects. For instance, beyond the immediate extensions of left-to-right, bottom-to-top and top-to-bottom page turns, stiffer or looser paper could be simulated by increasing the "curviness" of the grids.

A third advantage of the grid approach is that it is simple to extend it to animate multiple pages being turned, simply by rendering multiple grid transformations in sequence with less than a full page turn cycle between them. In the preferred embodiment, up to five or more turning pages may be rendered, preferably simultaneously, when the user jumps ahead or back in the printed matter. If the user wishes to jump more than five at a time, the system only shows five page turns for simplicity (although, the number of pages may be increased or decreased accordingly). Preferably, the number of turning pages rendered is proportional to the amount of pages actually flipped forward or back—i.e., if a user jumps three pages ahead, it would show three pages being flipped at once.

In one embodiment of the invention, the transformation meshes are pre-designed using a three-dimensional modeling system such as 3D STUDIO MAX®, from Autodesk Corp (Sausalito, Calif.). These programs are capable of converting a curved, four-sided polygon into a grid of coordinates and saving the data into a file for use by the present invention. A designer may push and pull a polygon into positions that realistically animate a certain type of paper being turned and output the resulting grids one at a time.

In another embodiment of the invention, the transformation meshes are not designed then loaded before the animation, but actually calculated during the animation itself. To accomplish this, a NURB (non-uniform rational b-spline) surface is stored, that represents the path of travel of the edges of the page to be displayed. The page itself is calculated by fitting a second NURB bounded on one side by the binding of the printed matter, and on the other side by two sides of the first NURB, with the additional constraint that tangents to the page NURB at its edges must equal normal vectors to the bounding NURB. Finally, a set of four tangent vectors to the page NURB are established, two parallel to the spine of the printed matter, and two normal to the spine. These vectors establish the unmoving edge of the turning page, fixed at the spine of the printed matter. The orientation of these latter two vectors vary in discrete steps throughout the page animation, beginning with pointing in the direction of the initial lay of the page, and at completion, pointing in a nearly opposite direction as the page turn animation completes.

By choosing discrete points along the edges of the bounding NURB and setting the outer corners of the page NURB to those points, the invention may then calculate a set of page NURBS that will simulate the page being turned. Each resulting page NURB may be subdivided into a grid and used exactly as before as a texture map grid, simply by iterating along the edge equations of the page NURB. Alternatively, if the rendering library and hardware support it, as is becoming more common, then the complete image of the page and its reverse side could be used as a pair of texture maps that are mapped onto the page NURBs themselves and rendered directly.

To make the animation realistic, the following constraints may be imposed. First, the length of each edge of the page NURB remains constant to prevent "deformations" of the paper. Second, the surface area of the page NURB may also remain unchanged during all animation. Methods to calculate edge length and surface area of NURBS is known in the art. The "stiffness" of the page NURB may be limited to a certain range of values. One solution for calculation of "stiffness" may be to limit the first derivative of any spline function that lies along the surface of the page NURB such any bends or buckles in the surface of the page NURB may be controlled.

The advantage of this second embodiment of a page-flip animation is that neither grid resolution or quantity of animation frames is predetermined, and instead can be changed at execution time, thus resulting in a more realistic page turn animation depending on available computer processing power.

Representation, calculation of NURB surfaces, and their reduction to discrete non-curved entities such as polygons, is known in the art. However, this technique of using one NURB as a boundary surface for a second surface in order to represent the configuration of a page of printed matter in motion has never been shown in the prior art.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto. The contents of any references cited throughout this application are hereby incorporated by reference. The appropriate components, processes, and methods of those documents may be selected for the present invention and embodiments thereof.

What is claimed is:

1. A method for electronically simulating interaction with images of printed matter, comprising:
   selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of turning a page when in double-page mode with an image of gatefold page obscuring a portion of an image of left-most page of the publication comprises:

responding to user input by moving the viewpoint farther away from the pages; and launching a right-to-left page turning animation for unfolding the gatefold page and revealing a page that was obscured by the gatefold page as well as a reverse side of the gatefold page.

2. A method for electronically simulating interaction with images of printed matter, comprising:

selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of the turning a page when in double-page mode with an image of a left-most unfolded gatefold page comprises:

responding to user input on the gatefold page by launching a left-to-right page turning animation that refolds the gatefold page;

moving the viewpoint closer to the pages substantially fitting the gatefold page and the right-most page within the display.

3. A method for electronically simulating interaction with images of printed matter, comprising:

selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of the turning a page when in double-page mode with an image of a gatefold page obscuring a portion of an image of a right-most page comprises:

responding to user input on the gatefold page by moving the viewpoint farther away from pages; and launching a left-to-right page turning animation for unfolding the gatefold page and simultaneously revealing a page obscured by the gatefold page and a reverse side of the gatefold page.

4. A method for electronically simulating interaction with images of printed matter, comprising:

selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of the turning of a page when in double-page mode with an image of a right-most unfolded gatefold page comprises:

responding to user input on the gatefold page by launching a right-to-left page turning animation that substantially refolds the gatefold; and moving the viewpoint closer to the pages wherein the gatefold page and the left-most page are substantially fitted within the display.

5. A method for electronically simulating interaction with images of printed matter, comprising:

selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of the turning of a page when in double-page mode where images of gatefold pages obscure portions of images of both a left-most page and a right-most page comprises:

responding to user input on the gatefold page by moving the viewpoint farther away from the pages;

launching a right-to-left page turning animation to unfold the left-most gatefold and simultaneously revealing the page obscured by the gatefold page and a reverse side of the gatefold page;

responding to user input on the gatefold page by moving the viewpoint farther away from the pages; and launching a left-to-right page turning animation for unfolding the right-most gatefold and simultaneously revealing a page obscured by the gatefold page and a reverse side of the gatefold page.

6. A method for electronically simulating interaction with images of printed matter, comprising:

selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of the turning of a page when in double-page mode with images of gatefold pages obscuring both images of a left-most page and a right-most page comprises:

responding to user input on the right-most gatefold page by moving the viewpoint farther away from the page;

launching a left-to-right page turning animation to unfold the gatefold page and simultaneously reveal the page that was obscured by the right-most gatefold page and a reverse side of the gatefold page;

responding to user input on the left-most gatefold page by moving the viewpoint farther away from the pages; and launching a right-to-left page turning animation to unfold the left-most gatefold and simultaneously reveal the page that was obscured by the gatefold page and a reverse side of the gatefold page.

7. A method for electronically simulating interaction with images of printed matter, comprising:

selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode; displaying a first image corresponding to a first printed page on the display, wherein the first printed page is part of a plurality of printed pages of a bound publication;

responding to user input to simulate turning the page to display a second image corresponding to a second printed page; and wherein the simulation of the turning of a page when in double-page mode with images of two unfolded gatefold pages, one on the left side and one on the right side, comprises:

responding to user input on the left-most gatefold page by launching a left-to-right page turning animation to refold the left-most gatefold;

moving the viewpoint closer to the pages;

substantially fitting the left-most gatefold page, the right-most page, and the unfolded right-most gatefold page into the display;

responding to user input on the right-most gatefold page by launching a right-to-left page turning animation to refold the right-most gatefold;

moving the viewpoint closer to the pages; and substantially fitting the left-most gatefold page and the right-most gatefold page into the display.

8. A method for electronically simulating interaction with images of printed matter, comprising:

selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of the turning of a page when in double-page mode with images of two "unfolded" gatefold pages, one on the left side and one on the right side comprises:

responding to user input on the right-most gatefold page by launching a right-to-left page turning animation to refold the right-most gatefold;

moving the viewpoint closer to the pages;

substantially fitting the left-most page, the right-most gatefold page, and the unfolded left-most gatefold page into the display;

responding to user input on the left-most gatefold page by launching a left-to-right page turning animation that refolds the left-most gatefold;

moving the viewpoint closer to the pages; and substantially fitting the left-most gatefold page and the right-most gatefold page within the display.

9. The method of claim 8, further comprising user input which launches:

a left-to-right page turning animation to refold the left-most gatefold;

a right-to-left page turning animation to refold the right-most gatefold;

moving the viewpoint closer to the pages; and substantially fitting both the left-most gatefold page and the right-most gatefold page within the display.

10. The method of claim 9, wherein upon the left-most edge of the left-most unfolded gatefold page being clicked on by a user, then subsequent to the change in viewpoint, a left-to-right page turning animation occurs which reveals two pages preceding the two gatefold pages.

11. The method of claim 9, wherein upon the right-most edge of the right-most unfolded gatefold page being clicked on by a user, then subsequent to the change in viewpoint, a right-to-left page turning animation occurs which reveals two pages following the two gatefold pages.

12. A method for electronically simulating interaction with images of printed matter, comprising:

selecting a display mode of a display, wherein the display mode comprises a single page view mode or a multiple page view mode, and wherein the single page view mode is selected from the group consisting of: a single-page mode, a single page mode with gatefold pages, and a single-page with an insert mode;

displaying a first image corresponding to a first printed page on the display, wherein the first printed page is part of a plurality of printed pages of a bound publication;

responding to user input to simulate turning the page to display a second image corresponding to a second printed page; and wherein the simulation of the turning of a page when in single-page mode where an image of a gatefold page obscures an image of a left-most page comprises:

responding to user input on the gatefold page by moving the viewpoint farther away from the pages so that two pages are viewed together in the same screen space previously allocated to one page; and launching a right-to-left page turning animation to unfold the gatefold to reveal a page that was obscured by the gatefold page and a reverse side of the gatefold page simultaneously.

13. The method according to claim 12, wherein the response to a mouse click on the left-most edge of the unfolded gatefold page comprises:
   launching a left-to-right page turning simulation to refold the left-most gatefold page;
   moving the viewpoint closer to the page and enable the gatefold page to substantially fill the display; and
   a second left-to-right page turning animation to reveal a page previous to the gatefold page.

14. The method according to claim 12, wherein the response to a mouse click on the right-most edge of the unfolded gatefold page comprises:
   launching a left-to-right page turning animation to refold the left-most gate fold;
   moving the viewpoint closer to the page to enable the gatefold page to substantially fill the display;
   moving the viewpoint to the right to reveal a page immediately following the page that the gatefold page obscures or a right-most gatefold page; moving the viewpoint farther away from the page upon the existence of a right-most gatefold; and
   a left-to-right page turning animation to unfold the right-most gatefold.

15. A method for electronically simulating interaction with images of printed matter, comprising:
   selecting a display mode of a display, wherein the display mode comprises a single page view mode or a multiple page view mode, and wherein the single page view mode is selected from the group consisting of: a single-page mode, a single page mode with gatefold pages, and a single-page with an insert mode;
   displaying a first image corresponding to a first printed page on the display, wherein the first printed page is part of a plurality of printed pages of a bound publication;
   responding to user input to simulate turning the page to display a second image corresponding to a second printed page; and
   wherein the simulation of the turning of a page when in single-page mode with an image of a gatefold page obscuring an image of a right-most page comprises:
   responding to a mouse-click on the left-most edge of the gatefold page by moving the viewpoint farther away from the page; and
   launching a left-to-right page turning animation to unfold the gatefold simultaneously revealing a page obscured by the right-most gatefold page and a reverse side of the gatefold page.

16. The method according to claim 15, wherein the response to a mouse click on the right-most edge of the unfolded right-most gatefold page comprises:
   launching a right-to-left page turning animation to refold the right-most gatefold;
   moving the viewpoint closer to the page enabling the gatefold page to substantially fill the display; and
   launching a second right-to-left page turning animation to reveal a page following the gatefold page.

17. A method for electronically simulating interaction with images of printed matter, comprising:
   selecting a display mode of a display, wherein the display mode comprises a single page view mode or a multiple page view mode, and wherein the single page view mode is selected from the group consisting of: a single-page mode, a single page mode with gatefold pages, and a single-page with an insert mode;
   displaying a first image corresponding to a first printed page on the display, wherein the first printed page is part of a plurality of printed pages of a bound publication;
   responding to user input to simulate turning the page to display a second image corresponding to a second printed page; and
   wherein the simulation of the turning of a page when in single-page mode with an insert comprises responding to a click on the right-most edge of an insert by launching a right-to-left page turning animation to reveal a reverse side of the insert and subsequently rendering the left-most facing page behind the insert.

18. A method for electronically simulating interaction with images of printed matter, comprising:
   selecting a display mode of a display, wherein the display mode comprises a single page view mode or a multiple page view mode, and wherein the multiple page view mode is selected from the group consisting of: a double-page mode, a double-page mode with gatefold pages, and a double-page with an insert mode;
   displaying a first image corresponding to a first printed page on the display, wherein the first printed page is part of a plurality of printed pages of a bound publication;
   responding to user input to simulate turning the page to display a second image corresponding to a second printed page; and
   wherein the simulation of the turning of a page when in double-page mode with an insert comprises responding to a click on the right-most edge of an insert by launching a right-to-left page turning animation to reveal a reverse side of the insert.

19. A method of simulating the effect of page turning comprising:
   displaying a first image corresponding to a first side of a printed page on a display, wherein an aspect ratio of the display is automatically adjusted to an aspect ratio of a printed document;
   responding to user input to simulate turning the printed page to display a second image corresponding to a second side of the printed page; and
   consecutively rendering individual representations of images of the page from a set of discrete representations one at a time to simulate the page being turned, wherein rendering each individual configuration comprises:
   creating an array of X, Y and Z first coordinates representing points on a grid in a three dimensional space;
   storing values in the array representing an image of the shape of the page at snapshots in time as the page is turned;
   dividing the image of the page into a rectilinear grid of second coordinates of sub-images whose aspect ratios match the aspect ratios of a set of convex four-sided polygons bounded by said X, Y and Z coordinates, wherein upon said grid of second coordinates includes a plurality of points A in one dimension and a plurality of second points B in another dimension, and the number of rectilinear sub-images are substantially in accordance with a formula $(A-1)*(B-1)$; and
   texture-mapping said grid of sub-images onto a set of convex four-sided polygons bounded by said first coordinate points.

20. The method according to claim 19, further comprising requesting a screen render of each resulting sub-image.

21. The method according to claim 19, wherein each coordinate comprises a double-precision floating-point number.

22. The method of claim 19, wherein the number of coordinates in the array of X, Y and Z coordinates determines a resolution of the page, and wherein a lower resolution is represented by fewer total points and a higher resolution is represented by more total points.

23. The method of claim 19, further comprising increasing the quantity of snapshots to provide a smoother page turning simulation.

24. The method of claim 19, further comprising decreasing the quantity of snapshots to provide a coarser page turning simulation.

25. A method of simulating the effect of page turning comprising:
 displaying a first image corresponding to a first side of a printed page on a display, wherein an aspect ratio of the display is automatically adjusted to an aspect ratio of a printed document;
 responding to user input to simulate turning the printed page to display a second image corresponding to a second side of the printed page; and
 consecutively rendering individual representations of images of the page from a set of discrete representations one at a time to simulate the page being turned, wherein rendering each individual configuration of the page comprises:
 calculating and storing a non-rational B-spline (NURB) surface to represent the page being turned, wherein first tangent vectors are defined at a spine edge to define the NURB surface at the spine, and wherein second tangent vectors are defined at an outer edge opposite the spine edge to substantially complete the NURB surface;
 calculating and storing a second NURB surface, to which third tangent vectors defined at an outer edge of the turning page NURB surface are normal;
 texture-mapping an image of the front page of the page being turned, onto a front side of the page NURB surface; and
 texture-mapping the image of the back page of the page being turned, onto the back side of the page NURB surface.

26. The method of claim 25, wherein the first tangent vectors defined at the spine edge of the page NURB surface vary throughout the page turning.

27. The method according to claim 26, wherein the variance of the first tangent vectors is broken into discrete steps.

28. The method according to claim 25, wherein the first tangent vectors defined at the spine edge vary by initially pointing in a direction of an initial lay of the page, and, substantially at completion, point in nearly an opposite direction as the page turn completes.

29. The method of claim 25, wherein the surface area of the page NURB surface and its edge lengths remain substantially fixed at all times.

30. A method of simulating the effect of page turning comprising:
 displaying a first image corresponding to a first side of a printed page on a display, wherein an aspect ratio of the display is automatically adjusted to an aspect ratio of a printed document;
 responding to user input to simulate turning the printed page to display a second image corresponding to a second side of the printed page; and
 consecutively rendering individual representations of images of the page from a set of discrete representations one at a time to simulate the page being turned, wherein a stiffness of the page is simulated by restricting a numerical range of a first derivative of a spline laid along a surface of the page NURB surface at a given point on the surface.

31. A system for performing a method of simulating the effect of page turning comprising:
 displaying means for displaying a first image corresponding to a first side of a printed page on a display, wherein an aspect ratio of the display is automatically adjusted to an aspect ratio of the printed document;
 responding means for responding to user input to simulate turning the printed page to display a second image corresponding to a second side of the printed page; and
 rendering means for consecutively rendering individual representations of images of the page from a set of discrete representations one at a time to simulate the page being turned, wherein the rendering means comprises:
 creating means for creating an array of X, Y and Z first coordinates representing points on a grid in a three dimensional space;
 storing means for storing values in the array representing an image of the shape of the page at snapshots in time as the page is turned;
 dividing means for dividing the image of the page into a rectilinear grid of second coordinates of sub-images whose aspect ratios match the aspect ratio of a set of convex four-sided polygons bounded by said X, Y and 2, coordinates, wherein upon said grid of second coordinates including a plurality of points A in one dimension and a plurality of second points B in another dimension, the number of rectilinear sub-images are substantially in accordance with a formula (A−1)*(B−1); and
 texture-mapping means for texture mapping said grid of sub-images onto a set of convex four-sided polygons bounded by said first coordinate points.

32. A computer readable medium including computer instructions for enabling a computer to perform a method of simulating the effect of page turning, the method comprising:
 displaying a first image corresponding to a first side of a printed page on a display, wherein an aspect ratio of the display is automatically adjusted to an aspect ratio of a printed document;
 responding to user input to simulate turning the printed page to display a second image corresponding to a second side of the printed page; and
 consecutively rendering individual representations of images of the page from a set of discrete representations one at a time to simulate the page being turned, wherein the computer instructions for performing the rendering step of the method comprises the method of creating an array of X, Y and Z first coordinates representing points on a grid in a three dimensional space;
 storing values in the array representing an image of the shape of the page at snapshots in time as the page is turned;
 dividing the image of the page into a rectilinear grid of second coordinates of sub-images whose aspect ratios match the aspect ratio of a set of convex four-sided polygons bounded by said X, Y and Z coordinates, wherein upon said grid of second coordinates including a plurality of points A in one dimension and a plurality of second points B in another dimension, the number of rectilinear sub-images are substantially in accordance with a formula $(A-1)*(B-1)$; and texture mapping said grid of sub-images onto a set of convex four-sided polygons bounded by said first coordinate points.

* * * * *

UNITED STATES PATENT AND TRADEMARK OFFICE
CERTIFICATE OF CORRECTION

PATENT NO. : 7,171,630 B2
APPLICATION NO. : 10/289619
DATED : January 30, 2007
INVENTOR(S) : O'Leary et al.

It is certified that error appears in the above-identified patent and that said Letters Patent is hereby corrected as shown below:

Claim 31
Column 20, line 33 delete "2, coordinates," and insert -- Z coordinates, --

Signed and Sealed this

Eighth Day of September, 2009

David J. Kappos
*Director of the United States Patent and Trademark Office*